US010780416B2

(12) United States Patent
Wendland et al.

(10) Patent No.: US 10,780,416 B2
(45) Date of Patent: Sep. 22, 2020

(54) POLYMERIC SORBENTS FOR ALDEHYDES

(71) Applicant: 3M INNOVATIVE PROPERTIES COMPANY, St. Paul, MN (US)

(72) Inventors: Michael S. Wendland, North St. Paul, MN (US); Michael W. Kobe, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 190 days.

(21) Appl. No.: 15/781,380

(22) PCT Filed: Dec. 15, 2016

(86) PCT No.: PCT/US2016/066818
§ 371 (c)(1),
(2) Date: Jun. 4, 2018

(87) PCT Pub. No.: WO2017/106434
PCT Pub. Date: Jun. 22, 2017

(65) Prior Publication Data
US 2018/0345246 A1 Dec. 6, 2018

Related U.S. Application Data

(60) Provisional application No. 62/269,613, filed on Dec. 18, 2015.

(51) Int. Cl.
*B01J 20/26* (2006.01)
*B01D 53/02* (2006.01)
(Continued)

(52) U.S. Cl.
CPC ............ *B01J 20/264* (2013.01); *B01D 53/02* (2013.01); *B01J 20/265* (2013.01);
(Continued)

(58) Field of Classification Search
None
See application file for complete search history.

(56) References Cited

U.S. PATENT DOCUMENTS 3,799,870 A 3/1974 Heilweil
4,273,751 A 6/1981 Sinha
(Continued)

FOREIGN PATENT DOCUMENTS

WO WO 2011/035195 3/2011
WO WO 2015/095110 6/2015
(Continued)

OTHER PUBLICATIONS

Gonte et al. (Gonte et al., Synthesis and Characterization of Mesoprous Hypercrosslinked Poly (Styren Co-Maleic Anhydride) Microspheres, International Journal of Polymeric Materials, 61:919-930, 2012). (Year: 2012).*

(Continued)

Primary Examiner — Anita Nassiri-Motlagh
(74) Attorney, Agent, or Firm — Jean A. Lown

(57) ABSTRACT

Polymeric sorbents for aldehydes including formaldehyde are provided. More particularly, the polymeric sorbents are a reaction product of a divinylbenzene/maleic anhydride precursor polymeric material with a nitrogen-containing compound. The nitrogen-containing compound is covalently attached to the resulting polymeric sorbent. Additionally, methods of sorbing aldehydes (i.e., aldehydes that are volatile under use conditions) on the polymeric sorbents and compositions resulting from the sorption of aldehydes on the polymeric sorbents are provided. The polymeric sorbents typically are porous with the pores often being in the size range of mesopores and/or micropores.

15 Claims, 2 Drawing Sheets

(51) Int. Cl.
C08F 212/36 (2006.01)
C08F 222/06 (2006.01)
C08F 8/32 (2006.01)
B01J 20/28 (2006.01)
C08F 212/08 (2006.01)

(52) U.S. Cl.
CPC ... B01J 20/28057 (2013.01); B01J 20/28061 (2013.01); B01J 20/28064 (2013.01); B01J 20/28069 (2013.01); B01J 20/28071 (2013.01); B01J 20/28073 (2013.01); C08F 8/32 (2013.01); C08F 212/36 (2013.01); C08F 222/06 (2013.01); B01D 2253/202 (2013.01); B01D 2253/25 (2013.01); B01D 2253/306 (2013.01); B01D 2253/311 (2013.01); B01D 2257/702 (2013.01); B01D 2257/708 (2013.01); B01D 2258/0283 (2013.01); B01D 2258/0291 (2013.01); B01D 2258/06 (2013.01); B01J 2220/49 (2013.01); C08F 212/08 (2013.01)

(56) References Cited

U.S. PATENT DOCUMENTS

| | | | |
|---|---|---|---|
| 4,443,354 | A | 4/1984 | Eian |
| 4,677,096 | A | 6/1987 | Van der Smissen |
| 6,930,219 | B2 | 8/2005 | Shan |
| 7,559,981 | B2 | 7/2009 | Friday |
| 8,470,074 | B2 | 6/2013 | Baugh |
| 9,776,131 | B2 | 10/2017 | Eisenberger |
| 2008/0319097 | A1 | 12/2008 | Johannsen |
| 2009/0060809 | A1 | 3/2009 | Shioya |
| 2014/0186250 | A1 | 7/2014 | Levan |
| 2017/0333870 | A1 | 11/2017 | Wendland |

FOREIGN PATENT DOCUMENTS

| | | |
|---|---|---|
| WO | WO 2015/095115 | 6/2015 |
| WO | WO 2016/186858 | 11/2016 |
| WO | WO 2016/205083 | 12/2016 |
| WO | WO 2016/205444 | 12/2016 |
| WO | WO 2017/106438 | 6/2017 |
| WO | WO 2017/106443 | 6/2017 |
| WO | WO 2017/160650 | 9/2017 |

OTHER PUBLICATIONS

Arean, "Carbon dioxide and nitrogen adsorption on porous copolymers of divinylbenzene and acrylic acid", Adsorption, Apr. 2013, vol. 19, No. 2-4, pp. 367-372.
Bicak, "Aldehyde Separation by Polymer-Supported Oligo (ethyleneimines)", Journal of Polymer Science: Part A: Polymer Chemistry, Jul. 1997, vol. 35, No. 14, pp. 2857-2864, XP55027595.
Bottcher, "Silica Sol-Gel Glasses with Embedded Organic Liquids", Advanced Materials, Feb. 1999, vol. 11, No. 2, pp. 138-141.
Carta, "Novel Spirobisindanes for Use as Precursors to Polymers of Intrinsic Microporosity", Organic Letters, 2008, vol. 10, No. 13, pp. 2641-2643.
Cecile, "Hydrophilic Polystyrene/Maleic Anhydride Ultrafine Fibrous Membranes", Journal of Applied Polymer Science, Jan. 2010, vol. 115, No. 2, pp. 723-730.
Chen, "Stability and Equilibrium Properties of Macroreticular Resins for Flue Gas Desulfurization", Industrial and Engineering Chemistry Research, 1990, vol. 29, No. 3, pp. 440-447, XP055356157.
Chowdhury, "Synthesis and characterization of radiation grafted films for removal of arsenic and some heavy metals from contaminated water", Radiation Physics and Chemistry, Oct. 2012, vol. 81, No. 10, pp. 1606-1611.
Croll, "Formation of Tectocapsules by Assembly and Cross-linking of Poly(divinylbenzene-alt-maleic anhydride) Spheres at the Oil-Water Interface", Langmuir, May 2003, vol. 19, No. 14, pp. 5918-5922, XP055355244.
Gorka, "KOH activation of mesoporous carbons obtained by soft-templating", Carbon, Jul. 2008, vol. 46, No. 8, pp. 1159-1161.
Harada, "Removal of primary and secondary amines by reaction gas chromatography using porous maleic anhydride—divinylbenzene copolymer beads", Pharmaceutical Science Department, Kumamoto University, Jul. 1982, vol. 31, pp. 697-701.
Kaliva, "Microporous Polystyrene Particles for Selective Carbon Dioxide Capture", Langmuir, Feb. 2012, vol. 28, No. 5, pp. 2690-2695.
Niu, "Highly dispersed Ru on K-doped meso-macroporous $SiO_2$ for the preferential oxidation of CO in $H_2$-rich gases", International Journal of Hydrogen Energy, 2014, vol. 39, No. 25, pp. 13800-13807.
Ogawa, "Preparation of Spherical Polymer Beads of Maleic Anhydride-Styrene-Divinylbenzene and Metal Sorption of its Derivatives", Journal of Applied Polymer Science, 1984, vol. 29, No. 9, pp. 2851-2856.
Okay, "Porous Maleic Anhydride-Styrene-Divinylbenzene Copolymer Beads", Journal of Applied Polymer Science, Jul. 1987, vol. 34, pp. 307-317, XP055356037.
Song, "Coordination of Metal Cations with Amino-Functionalized MCM-41 for Adsorptive Desulfurization", Advanced Materials Research, 2014, vols. 926-930, pp. 4222-4225.
Woodward, "Swellable, Water- and Acid-Tolerant Polymer Sponges for Chemoselective Carbon Dioxide Capture", Journal of the American Chemical Society, 2014, vol. 136, No. 25, pp. 9028-9035.
Yan, "In situ growth of a carbon interphase between carbon fibres and a polycarbosilane-derived silicon carbide matrix", Carbon, 2011, vol. 49, No. 8, pp. 2869-2877.
Yang, "A Pervaporation Study of Ammonia Solutions Using Molecular Sieve Silica Membranes", Membranes, 2014, vol. 4, No. 1, pp. 40-54.
Yim, "Removal of Formaldehyde Over Amine Functionalized SBA-15", Journal of Nanoscience and Nanotechnology, 2011, vol. 11, No. 2, pp. 1714-1717.
International Search Report for PCT International Application No. PCT/US2016/066818, dated Apr. 4, 2017, 5 pages.

* cited by examiner

POLYMERIC SORBENTS FOR ALDEHYDES

CROSS REFERENCE TO RELATED APPLICATIONS

This application is a national stage filing under 35 U.S.C. 371 of PCT/US2016/066818, filed Dec. 15, 2016, which claims the benefit of U.S. Provisional Application No. 62/269,613, filed Dec. 18, 2015, the disclosure of which is incorporated by reference in its/their entirety herein.

TECHNICAL FIELD

Polymeric sorbents for aldehydes, methods of sorbing aldehydes on the polymeric sorbents, and compositions resulting from the sorption of aldehydes on the polymeric sorbents are provided.

BACKGROUND

Formaldehyde is a known carcinogen and allergen. For this reason, the Occupational Safety and Health Administration (OSHA) in the United States has set an eight hour exposure limit of 0.75 parts per million and a 15 minute exposure limit of 2 parts per million for formaldehyde vapor. In spite of its toxicity, formaldehyde is a high volume industrial compound. It is used, for example, to prepare a number of polymeric materials that find widespread use in various building materials including foam insulation, particle board, carpet, paint, and varnish. Out-gassing of residual formaldehyde from these building materials makes formaldehyde one of the most prevalent indoor air pollutants. Formaldehyde is also a by-product of the combustion of organic materials. As a result, formaldehyde is a common outdoor pollutant as well arising from automobile exhaust, methane combustion, forest fires, and cigarette smoke.

While in North America strict formaldehyde out-gassing limitations are placed on building materials, this is not the case in all parts of the world. In some Asian countries, for example, few restrictions are placed on building materials. Combined with an increased use of biofuels to heat homes and to run automobiles, dangerous levels of formaldehyde vapor may occur in both indoor and outdoor air. For this reason, there is an immediate need for solutions to mitigate human exposure to formaldehyde vapor both as an indoor and an outdoor air pollutant.

The high volatility of formaldehyde (it is a gas at room temperature) makes it extremely difficult to capture by the mechanism of physisorption alone. Because formaldehyde is reactive, however, it can be more readily captured through chemisorption. With chemisorption, the formaldehyde vapors are captured by chemically reacting with the sorbent itself or with chemicals impregnated in the sorbent. Thus, the key to making high capacity sorbents for formaldehyde is to provide a sorbent with many reactive sites for formaldehyde.

One typical sorbent material that has been used for capturing formaldehyde is based on activated carbon scaffolds. The scaffold of activated carbon, however, is relatively inactive and this inactivity makes it difficult to incorporate a high density of reactive groups into the activated carbon scaffold itself. For this reason, most of the efforts in making sorbents for formaldehyde have been focused on finding impregnation chemistries that can react with formaldehyde. Thus, the activated carbon scaffolds are typically impregnated with various chemistries to react with formaldehyde. The two most common impregnation chemistries used for formaldehyde capture are the sodium salt of sulfamic acid and ethylene urea co-impregnated with phosphoric acid. Various other metal salts have been used as well.

Impregnation in general has some drawbacks for making sorbents. First, impregnation chemistries can migrate and this is problematic especially if other sorbents are used in the same product. Another disadvantage to impregnation is that it removes activated carbon's capacity for adsorbing volatile organic compounds (VOCs). The impregnation chemistry occupies the pores of the activated carbon thus reducing the surface area available to capture non-reactive vapors that are captured by physisorption only.

SUMMARY

Polymeric sorbents for aldehydes including formaldehyde are provided. More particularly, the polymeric sorbents are a reaction product of a divinylbenzene/maleic anhydride precursor polymeric material with a nitrogen-containing compound. The nitrogen-containing compound is covalently attached to the resulting polymeric sorbent. Additionally, methods of sorbing aldehydes (i.e., aldehydes that are volatile under use conditions) on the polymeric sorbents and compositions resulting from the sorption of aldehydes on the polymeric sorbents are provided. The polymeric sorbents typically are porous; the pores of the polymeric sorbent are often in the size range of mesopores and/or micropores.

In a first aspect, a polymeric sorbent is provided. The polymeric sorbent is a reaction product of (a) a precursor polymeric material and (b) a nitrogen-containing compound. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia, a compound having a single primary amino group ($-NH_2$), or a compound having at least two amino groups of formula $-NHR$ where R is hydrogen or alkyl.

In a second aspect, a method of sorbing an aldehyde on a polymeric sorbent is provided. The method includes providing a polymeric sorbent as described above and then sorbing the aldehyde on the polymeric sorbent. The aldehyde is of Formula (I)

$$R_2-(CO)-H \qquad (I)$$

where $R_2$ is hydrogen, alkyl, vinyl, or aryl. The molecular weight of the aldehyde of Formula (I) is typically no greater than 200 grams/mole.

In a third aspect, a composition is provided that includes (a) a polymeric sorbent as described above and (b) an aldehyde sorbed on the polymeric sorbent. The aldehyde is of Formula (I)

$$R_2-(CO)-H \qquad (I)$$

where $R_2$ is hydrogen, alkyl, vinyl, or aryl. The molecular weight of the aldehyde of Formula (I) is typically no greater than 200 grams/mole.

In a fourth aspect, a method of preparing a polymeric sorbent is provided. The method includes providing a precursor polymeric material. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The method further includes reacting the precursor polymeric material with a nitrogen-containing compound that is selected from ammonia, a compound having a single primary amino group (—$NH_2$), or a compound having at least two amino groups of formula —NHR where R is hydrogen or alkyl. The reaction results in the formation of the polymeric sorbent having a covalently attached nitrogen-containing group.

DETAILED DESCRIPTION

Figure 1:
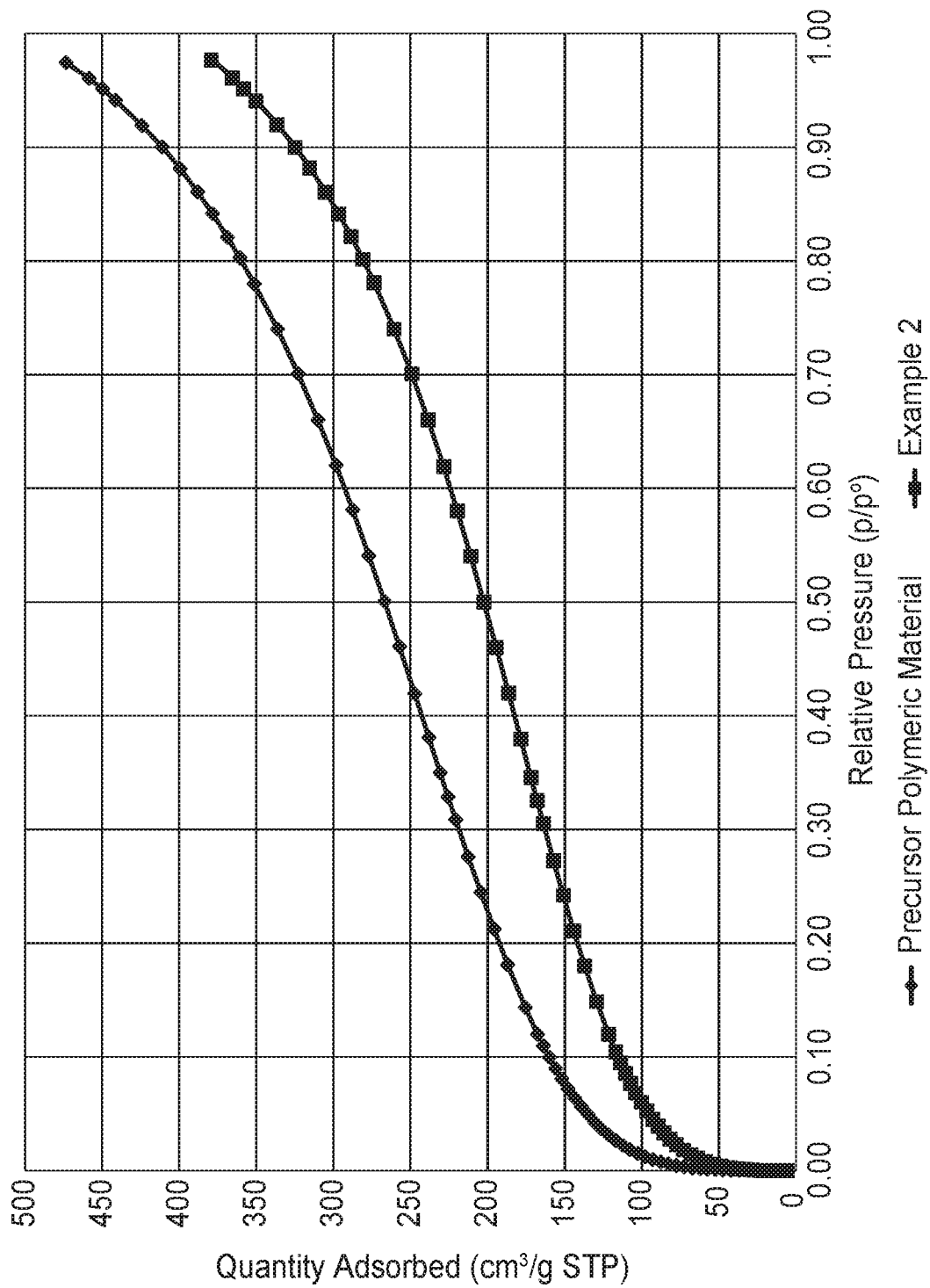
FIG. 1 is the argon adsorption isotherms at 77° K and at relative pressures up to 0.98±0.01 for the polymeric sorbent of Example 3 and the precursor polymeric material from which it was prepared.

Polymeric sorbents are provided. Additionally, methods of making the polymeric sorbents, methods of sorbing aldehydes on the polymeric sorbents, and compositions resulting from sorption of aldehydes on the polymeric sorbents are provided. The polymeric sorbents typically are porous, with the pores often being in the size range of mesopores and/or micropores.

More particularly, the polymeric sorbents are a reaction product of a divinylbenzene/maleic anhydride precursor polymeric material with a nitrogen-containing compound. The nitrogen-containing compound is covalently attached to the polymeric sorbents. The polymeric sorbent can be used to sorb aldehydes that are volatile at room temperature or under use conditions. Suitable aldehydes are typically of Formula (I)

$$R_2-(CO)-H \quad\quad (I)$$

where $R_2$ is hydrogen, alkyl, vinyl, or aryl. The molecular weight of the aldehyde of Formula (I) is typically no greater than 200 grams/mole. In some embodiments, the aldehyde is formaldehyde ($R_2$ is hydrogen) or acetaldehyde ($R_2$ is methyl).

The terms "a", "an", and "the" are used interchangeably with "at least one" to mean one or more of the elements being described.

The term "and/or" means either or both. For example "A and/or B" means only A, only B, or both A and B.

The terms "polymer" and "polymeric material" are used interchangeably and refer to materials formed by reacting one or more monomers. These terms include homopolymers, copolymers, terpolymers, or the like. Likewise, the terms "polymerize" and "polymerizing" refer to the process of making a polymeric material that can be a homopolymer, copolymer, terpolymer, or the like.

The terms "polymeric sorbent" and "porous polymeric sorbent" are used interchangeably to refer to a polymeric material that is porous and that can sorb gaseous substances such as, for example, aldehydes. Porous materials such as the polymeric sorbents can be characterized based on the size of their pores. The term "micropores" refers to pores having a diameter less than 2 nanometers. The term "mesopores" refers to pores having a diameter in a range of 2 to 50 nanometers. The term "macropores" refers to pores having a diameter greater than 50 nanometers. The porosity of a polymeric sorbent can be characterized from an adsorption isotherm of an inert gas such as nitrogen or argon by the porous material under cryogenic conditions (e.g., liquid nitrogen at 77° K). The adsorption isotherm is typically obtained by measuring adsorption of the inert gas such as argon by the porous polymeric sorbent at multiple relative pressures in a range of about $10^{-6}$ to about 0.98±0.01. The isotherms are then analyzed using various methods such as the BET (Brunauer-Emmett-Teller) method to calculate specific surface area and such as Density Functional Theory (DFT) to characterize the porosity and the pore size distribution.

The term "sorbing" and similar words such as "sorb", "sorbed", and "sorption" refer to the addition of a first substance (e.g., a gas such as an aldehyde) to a second substance (e.g., a polymeric material such as the porous polymeric sorbent) by adsorbing, absorbing, or both. Likewise, the term "sorbent" refers to a second substance that sorbs a first substance by adsorbing, absorbing, or both.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (e.g., liquid nitrogen at 77° K) over a range of relative pressures. The term "BET specific surface area" is the surface area per gram of a material (typically, $m^2/gram$) that is usually calculated from adsorption isotherm data of the inert gas over a relative pressure range of 0.05 to 0.30 using the BET method.

The term "polymerizable composition" includes all materials included in the reaction mixture used to form the polymeric material. The polymerizable composition includes, for example, the monomer mixture, the organic solvent, the initiator, and other optional components. Some of the components in the polymerizable composition such as the organic solvent may not undergo a chemical reaction but can influence the chemical reaction and the resulting polymeric material.

The term "monomer mixture" refers to that portion of a polymerizable composition that includes the monomers. More specifically, as used herein, the monomer mixture includes at least divinylbenzene and maleic anhydride.

The terms "divinylbenzene/maleic anhydride polymeric material" and "divinylbenzene/maleic anhydride precursor polymeric material" are used interchangeably and refer to a polymeric material prepared from divinylbenzene, maleic anhydride, and optionally a styrene-type monomer.

The term "styrene-type monomer" refers to styrene, an alkyl-substituted styrene (e.g., ethyl styrene), or mixtures thereof. These monomers are often present in divinylbenzene as impurities.

The term "room temperature" refers to a temperature in a range of 20° C. to 30° C., in a range of 20° C. to 25° C., in a range close to and including 25° C., or 25° C.

In one aspect, a polymeric sorbent is provided. In another aspect, a method of preparing a polymeric sorbent is provided. The porous polymeric sorbent is formed by reacting a precursor polymeric material with a nitrogen-containing compound. The precursor polymeric material is formed from divinylbenzene, maleic anhydride, and an optional styrene-type monomer. The precursor polymeric material can be referred to as a divinylbenzene/maleic anhydride polymeric material. The conditions used to synthesize the precursor polymeric material are selected to produce a polymeric sorbent that has a BET specific surface area equal to at least 25 m²/gram. The nitrogen-containing compound reacts with an anhydride group in the precursor polymeric material. This reaction results in the formation of a covalent bond linking the nitrogen-containing compound to the polymeric material. That is, the nitrogen-containing compound becomes part of the polymeric sorbent.

The precursor polymeric material (i.e., the divinylbenzene/maleic anhydride polymeric material) is synthesized from a polymerizable composition that includes a monomer mixture containing maleic anhydride, divinylbenzene, and an optional styrene-type monomer. More specifically, the precursor polymeric material is formed from a monomer mixture containing 1) 8 to 65 weight percent maleic anhydride, 2) 30 to 85 weight percent divinylbenzene, and 3) 0 to 40 weight percent of a styrene-type monomer, wherein the styrene-type monomer is styrene, an alkyl-substituted styrene, or a combination thereof. The amounts are based on the total weight of monomers in the monomer mixture, which is equal to the total weight of monomers in the polymerizable composition. When the precursor polymeric material is used to form a polymeric sorbent that is particularly effective for sorption of aldehydes, the monomer mixture often contains 1) 15 to 65 weight percent maleic anhydride, 2) 30 to 85 weight percent divinylbenzene, and 3) 0 to 40 weight percent of a styrene-type monomer, wherein the styrene-type monomer is styrene, an alkyl-substituted styrene, or a combination thereof.

The maleic anhydride that is included in the monomer mixture results in the formation of maleic anhydride monomeric units of Formula (II) within the precursor polymeric material.

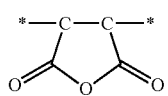
(II)

The asterisks in this formula and other formulas contained herein denote the location of attachment of the monomeric unit to another monomeric unit or to a terminal group.

The amount of maleic anhydride used to form the precursor polymeric material influences the amount of nitrogen-containing compound that can react with the precursor polymeric material to form the polymeric sorbent. The nitrogen-containing compound reacts with the anhydride group to become covalently attached to the polymeric material that is the polymeric sorbent.

In some embodiments, the amount of maleic anhydride included in the monomer mixture is at least 8 weight percent, at least 10 weight percent, at least 12 weight percent, at least 15 weight percent, or at least 20 weight percent. The amount of maleic anhydride can be up to 65 weight percent, up to 60 weight percent, up to 55 weight percent, up to 50 weight percent, up to 45 weight percent, up to 40 weight percent, up to 35 weight percent, up to 30 weight percent, or up to 25 weight percent. For example, the maleic anhydride may be present in a range of 8 to 65 weight percent, 15 to 65 weight percent, 15 to 60 weight percent, 15 to 50 weight percent, 15 to 40 weight percent, 20 to 65 weight percent, 20 to 60 weight percent, 20 to 50 weight percent, 20 to 40 weight percent, 30 to 65 weight percent, 30 to 60 weight percent, 30 to 50 weight percent, 40 to 65 weight percent, or 40 to 60 weight percent. The amounts are based on the total weight of monomers in the monomer mixture contained in the polymerizable composition used to form the precursor polymeric material.

Stated differently, the precursor polymeric material contains monomeric units of Formula (II) in a range of 8 to 65 weight percent, 15 to 65 weight percent, 15 to 60 weight percent, 15 to 50 weight percent, 15 to 40 weight percent, 20 to 65 weight percent, 20 to 60 weight percent, 20 to 50 weight percent, 20 to 40 weight percent, 30 to 65 weight percent, 30 to 60 weight percent, 30 to 50 weight percent, 40 to 65 weight percent, or 40 to 60 weight percent. These amounts are based on the total weight of the monomeric units in the precursor polymeric material.

The divinylbenzene included in the monomer mixture results in the formation of divinylbenzene monomeric units of Formula (III) within the precursor polymeric material.

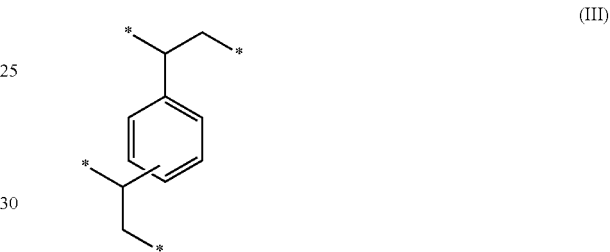
(III)

The two groups attached to the benzene ring can be in an ortho, meta, or para arrangement to each other. The monomeric units of Formula (III) contribute to the high crosslink density and to the formation of a rigid polymeric material having micropores and/or mesopores.

The amount of divinylbenzene used to form the precursor polymeric material can have a strong influence on the BET specific surface area of both the precursor polymeric material and the polymeric sorbent. The BET specific surface area tends to increase with an increase in the amount of divinylbenzene in the monomer mixture used to form the precursor polymeric material and with the resulting amount of monomeric units of Formula (III) in the polymeric sorbent. If the amount of divinylbenzene is less than 30 weight percent, the polymeric sorbent may not have a sufficiently high BET specific surface area. On the other hand, if the amount of divinylbenzene is greater than 85 weight percent, the amount of aldehyde sorbed may be compromised because there are fewer nitrogen-containing groups in the polymeric sorbent. In some embodiments, the amount of divinylbenzene included in the monomer mixture is at least 30 weight percent, at least 35 weight percent, at least 40 weight percent, or at least 45 weight percent. The amount of divinylbenzene can be up to 85 weight percent, up to 80 weight percent, up to 75 weight percent, up to 70 weight percent, up to 65 weight percent, up to 60 weight percent, up to 50 weight percent. For example, the amount can be in a range of 30 to 85 weight percent, 30 to 80 weight percent, 30 to 75 weight percent, 30 to 70 weight percent, 30 to 65 weight percent, 30 to 60 weight percent, 30 to 55 weight percent, 30 to 50 weight percent, 35 to 80 weight percent, 35 to 70 weight percent, 35 to 60 weight percent, 40 to 85 weight percent, 40 to 80 weight percent, 40 to 70 weight percent, or 40 to 60 weight percent. The amounts are based on the total weight of monomers in the monomer mixture contained in the polymerizable composition used to form the precursor polymeric material.

Stated differently, the precursor polymeric material contains monomeric units of Formula (III) in a range of 30 to 85 weight percent, 30 to 80 weight percent, 30 to 75 weight percent, 30 to 70 weight percent, 30 to 65 weight percent, 30 to 60 weight percent, 30 to 55 weight percent, 30 to 50 weight percent, 35 to 80 weight percent, 35 to 70 weight percent, 35 to 60 weight percent, 40 to 85 weight percent, 40 to 80 weight percent, 40 to 70 weight percent, or 40 to 60 weight percent. These amounts are based on the total weight of the monomeric units in the precursor polymeric material.

Divinylbenzene can be difficult to obtain in a pure form. For example, divinylbenzene is often commercially available with purity as low as 55 weight percent. Obtaining divinylbenzene with purity greater than about 80 weight percent can be difficult and/or expensive. The impurities accompanying divinylbenzene are typically styrene-type monomers such as styrene, alkyl-substituted styrene (e.g., ethyl styrene), or mixtures thereof. Thus, styrene-type monomers are often present along with divinylbenzene and maleic anhydride in the monomer mixture contained in the polymerizable composition used to form the precursor polymeric material. The monomer mixture typically contains 0 to 40 weight percent styrene-type monomers based on the total weight of monomers in the monomer mixture. If the content of the styrene-type monomer is greater than 40 weight percent, the crosslink density may be too low and/or the distance between crosslinks may be too large to provide a polymeric sorbent with the desired BET specific surface area (e.g., at least 25 $m^2$/grams). As the crosslink density decreases, the polymeric sorbent tends to be less rigid and less porous. Typically, divinylbenzene having a purity of 55 weight percent is not suitable for use in the monomer mixtures used to form the precursor polymeric material because the content of styrene-type monomer impurities is too high. That is, to provide a monomer mixture having a minimum amount of divinylbenzene, the divinylbenzene often is at least about 80 weight percent pure. Using divinylbenzene having a lower purity than about 80 weight percent can result in the formation of a precursor polymeric material and/or a polymeric sorbent with an undesirably low BET specific surface area.

The styrene-type monomers included in the monomer mixture result in the presence of styrene-type monomeric units of Formula (IV) within the precursor polymeric material.

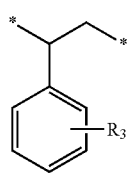

(IV)

Group $R_3$ is hydrogen or alkyl (e.g., an alkyl having 1 to 10 carbon atoms, 1 to 6 carbon atoms or 1 to 4 carbon atoms).

In some embodiments, the amount of styrene-type monomers used to form the precursor polymeric material, is at least 1 weight percent, at least 2 weight percent, or at least 5 weight percent. The amount of styrene-type monomers can be up to 40 weight percent, up to 30 weight percent, up to 20 weight percent, or up to 10 weight percent. For example, the amount can be in a range of 0 to 40 weight percent, 1 to 40 weight percent, 5 to 40 weight percent, 10 to 40 weight percent, 0 to 30 weight percent, 1 to 30 weight percent, 5 to 30 weight percent, 10 to 30 weight percent, 0 to 20 weight percent, 1 to 20 weight percent, 5 to 20 weight percent, or 10 to 20 weight percent. The amounts are based on the total weight of monomers in the monomer mixture contained in the polymerizable composition used to form the precursor polymeric material.

Stated differently, the precursor polymeric material contains monomeric units of Formula (IV) in a range of 0 to 40 weight percent, 1 to 40 weight percent, 5 to 40 weight percent, 10 to 40 weight percent, 0 to 30 weight percent, 1 to 30 weight percent, 5 to 30 weight percent, 10 to 30 weight percent, 0 to 20 weight percent, 1 to 20 weight percent, 5 to 20 weight percent, or 10 to 20 weight percent. These amounts are based on the total weight of the monomeric units in the precursor polymeric material.

Overall, the precursor polymeric material is formed from a polymerizable composition containing a monomer mixture that includes 8 to 65 weight percent maleic anhydride, 30 to 85 weight percent divinylbenzene, and 0 to 40 weight percent of a styrene-type monomer. In some embodiments, the monomer mixture contains 15 to 65 weight percent maleic anhydride, 30 to 85 weight percent divinylbenzene, and 0 to 40 weight percent (or 5 to 40 weight percent) of a styrene-type monomer. Some embodiments contain 25 to 65 weight percent maleic anhydride, 30 to 75 weight percent divinylbenzene, and 1 to 20 weight percent (or 5 to 20 weight percent) styrene-type monomer. Some embodiments contain 25 to 60 weight percent maleic anhydride, 30 to 75 weight percent divinylbenzene, and 1 to 30 weight percent (or 5 to 30 weight percent or 10 to 30 weight percent) styrene-type monomer. In still other embodiments, the monomer mixture contains 30 to 65 weight percent maleic anhydride, 30 to 70 weight percent divinylbenzene, and 1 to 20 weight percent (or 5 to 20 weight percent or 10 to 20 weight percent) styrene-type monomer. In still other embodiments, the monomer mixture contains 30 to 60 weight percent maleic anhydride, 30 to 65 weight percent divinylbenzene, and 1 to 20 weight percent (or 5 to 20 weight percent or 10 to 20 weight percent) styrene-type monomer. In further embodiments, the monomer mixture contains 40 to 60 weight percent maleic anhydride, 30 to 55 weight percent divinylbenzene, and 1 to 20 weight percent (or 5 to 20 weight percent, or 10 to 20 weight percent) styrene-type monomers. In still further embodiments, the monomer mixture contains 20 to 40 weight percent maleic anhydride, 50 to 70 weight percent divinylbenzene, and 1 to 20 weight percent (or 5 to 20 weight percent or 10 to 20 weight percent) styrene-type monomer. The weight percent values are based on the total weight of monomers in the monomer mixture used to form the precursor polymeric material.

The monomer mixture included in the polymerizable composition used to form the precursor polymeric material typically contains at least 95 weight percent monomers selected from maleic anhydride, divinylbenzene, and styrene-type monomer. For example, at least 97 weight percent, at least 98 weight percent, at least 99 weight percent, at least 99.5 weight percent, at least 99.9 weight percent, or 100 weight percent of the monomers in the monomer mixture are selected from maleic anhydride, divinylbenzene, and styrene-type monomer. In some embodiments, where high purity divinylbenzene is used, the monomer mixture contains only divinylbenzene and maleic anhydride. That is, the sum of the amount of divinylbenzene and maleic anhydride is 100 weight percent.

In addition to the monomer mixture, the polymerizable composition used to form the precursor polymeric material includes an organic solvent. The polymerizable composition is a single phase prior to polymerization. Stated differently, prior to polymerization, the polymerizable composition is not a suspension. The organic solvent is selected to dissolve the monomers included in the monomer mixture and to solubilize the precursor polymeric material as it begins to form. The organic solvent typically includes a ketone, ester, acetonitrile, or mixture thereof.

The organic solvent can function as a porogen during the formation of the precursor polymeric material. The organic solvent choice can strongly influence the BET specific surface area and the size of the pores formed in the precursor polymeric material. Using organic solvents that are miscible with both the monomers and the forming polymer tends to result in the formation of micropores and mesopores within the precursor polymeric material. Good solvents for the monomers and the forming polymer tend to result in a larger fraction of the porosity of the final polymeric sorbent being in the form of micropores and mesopores.

Organic solvents that are particularly suitable include ketones, esters, acetonitrile, and mixtures thereof. Provided that the resulting precursor polymeric material has a BET specific surface area equal to at least 100 $m^2$/gram, other organic solvents can be added along with one or more of these organic solvents. Examples of suitable ketones include, but are not limited to, alkyl ketones such as methyl ethyl ketone and methyl isobutyl ketone. Examples of suitable esters include, but are not limited to, acetate esters such as ethyl acetate, propyl acetate, butyl acetate, amyl acetate, and tert-butyl acetate.

The organic solvent can be used in any desired amount. The polymerizable compositions often have percent solids in a range of 1 to 75 weight percent (i.e., the polymerizable composition contains 25 to 99 weight percent organic solvent). If the percent solids are too low, the polymerization time may become undesirably long. The percent solids are often at least 1 weight percent, at least 2 weight percent, at least 5 weight percent, at least 10 weight percent, or at least 15 weight percent. If the weight percent solids is too great, however, the monomers do not form a single phase with the organic solvent. Further, increasing the percent solids tends to result in the formation of precursor polymeric material with a lower BET specific surface area. The percent solids can be up to 75 weight percent, up to 70 weight percent, up to 60 weight percent, up to 50 weight percent, up to 40 weight percent, up to 30 weight percent, or up to 25 weight percent. For example, the percent solids can be in a range of 5 to 75 weight percent, 5 to 70 weight percent, 5 to 60 weight percent, 5 to 50 weight percent, 5 to 40 weight percent, 5 to 30 weight percent, or 5 to 25 weight percent.

In addition to the monomer mixture and organic solvent, the polymerizable compositions used to form the precursor polymeric material typically include an initiator for free radical polymerization reactions. Any suitable free radical initiator can be used. Suitable free radical initiators are typically selected to be miscible with the monomers included in the polymerizable composition. In some embodiments, the free radical initiator is a thermal initiator that can be activated at a temperature above room temperature. In other embodiments, the free radical initiator is a redox initiator. Because the polymerization reaction is a free radical reaction, it is desirable to minimize the amount of oxygen in the polymerizable composition.

Both the type and amount of initiator can affect the polymerization rate. In general, increasing the amount of the initiator tends to lower the BET specific surface area; however, if the amount of initiator is too low, it may be difficult to obtain high conversions of the monomers to polymeric material. The free radical initiator is typically present in an amount in a range of 0.05 to 10 weight percent, 0.05 to 8 weight percent, 0.05 to 5 weight percent, 0.1 to 10 weight percent, 0.1 to 8 weight percent, 0.1 to 5 weight percent, 0.5 to 10 weight percent, 0.5 to 8 weight percent, 0.5 to 5 weight percent, 1 to 10 weight percent, 1 to 8 weight percent, or 1 to 5 weight percent. The weight percent is based on the total weight of monomers in the polymerizable composition.

Suitable thermal initiators include organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile)), which is often referred to as AIBN, and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide and mixtures thereof. The temperature needed to activate the thermal initiator is often in a range of 25° C. to 160° C., in a range of 30° C. to 150° C., in a range of 40° C. to 150° C., in a range of 50° C. to 150° C., in a range of 50° C. to 120° C., or in a range of 50° C. to 110° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al (III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

The polymerizable composition is typically free or substantially free of surfactants. As used herein, the term "substantially free" in reference to the surfactant means that no surfactant is purposefully added to the polymerizable composition and any surfactant that may be present is the result of being an impurity in one of the components of the polymerizable composition (e.g., an impurity in the organic solvent or in one of the monomers). The polymerizable composition typically contains less than 0.5 weight percent, less than 0.3 weight percent, less than 0.2 weight percent, less than 0.1 weight percent, less than 0.05 weight percent, or less than 0.01 weight percent surfactant based on the total weight of the polymerizable composition. The absence of a surfactant is advantageous because these materials tend to restrict access to and, in some cases, fill micropores and mesopores in a precursor polymeric material.

When the polymerizable composition is heated in the presence of a free radical initiator, polymerization of the monomers in the monomer mixture occurs. By balancing the amounts of each monomer in the monomer mixture and by selection of an organic solvent that can solubilize all of the monomers and the growing polymeric material during its early formation stage, a precursor polymeric material can be prepared that has a BET specific surface area equal to at least 100 $m^2$/gram. The BET specific surface area of the precursor polymeric material can be at least 150 $m^2$/gram, at least 200 $m^2$/gram, or at least 300 $m^2$/gram. The BET specific surface area can be, for example, up to 1000 $m^2$/gram or higher, up to 900 $m^2$/gram, up to 800 $m^2$/gram, up to 750 $m^2$/gram, or up to 700 $m^2$/gram.

The precursor polymeric material is the reaction product of the polymerizable composition. The precursor polymeric material formed from the polymerizable composition contains (a) 8 to 65 weight percent of a first monomeric unit of Formula (II),

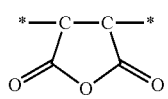
(II)

(b) 30 to 85 weight percent of a second monomeric unit of Formula (III), and

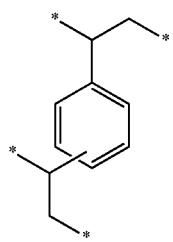
(III)

(c) 0 to 40 weight percent of a third monomeric unit of Formula (IV) wherein $R_3$ is hydrogen or alkyl (e.g., an alkyl having 1 to 10 carbon atoms, 1 to 6 carbon atoms, or 1 to 4 carbon atoms).

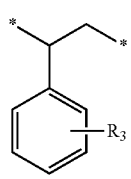
(IV)

In many embodiments, to be particularly effective as a polymeric sorbent for aldehydes, the precursor polymeric material contains (a) 15 to 65 weight percent of a first monomeric unit of Formula (II), (b) 30 to 85 weight percent of a second monomeric unit of Formula (III), and (c) 0 to 40 weight percent (or 5 to 40 weight percent) of a third monomeric unit of Formula (IV). Each weight percent value is based on the total weight of monomeric units in the precursor polymeric material.

Some embodiments of the precursor polymeric material contain 25 to 65 weight percent of the first monomeric unit of Formula (II), 30 to 75 weight percent of the second monomeric unit of Formula (III), and 1 to 20 weight percent (or 5 to 20 weight percent) of the fourth monomeric unit of Formula (IV). Some embodiments contain 25 to 60 weight percent of the first monomeric unit of Formula (II), 30 to 75 weight percent of the second monomeric unit of Formula (III), and 1 to 30 weight percent (or 5 to 30 weight percent or 10 to 30 weight percent) of the fourth monomeric unit of Formula (IV). In still other embodiments, the monomer mixture contains 30 to 65 weight percent of the first monomeric unit of Formula (II), 30 to 70 weight percent of the second monomeric unit of Formula (III), and 1 to 20 weight percent (or 5 to 20 weight percent or 10 to 20 weight percent) of the fourth monomeric unit of Formula (IV). In still other embodiments, the monomer mixture contains 30 to 60 weight percent of the first monomeric unit of Formula (II), 30 to 65 weight percent of the second monomeric unit of Formula (III), and 1 to 20 weight percent (or 5 to 20 weight percent or 10 to 20 weight percent) of the fourth monomeric unit of Formula (IV). In further embodiments, the monomer mixture contains 40 to 60 weight percent of the first monomeric unit of Formula (II), 30 to 55 weight percent of the second monomeric unit of Formula (III), and 1 to 20 weight percent (or 5 to 20 weight percent, or 10 to 20 weight percent) of the fourth monomeric unit of Formula (IV). In still further embodiments, the monomer mixture contains 20 to 40 weight percent of the first monomeric unit of Formula (II), 50 to 70 weight percent of the second monomeric unit of Formula (III), and 1 to 20 weight percent (or 5 to 20 weight percent or 10 to 20 weight percent) of the fourth monomeric unit of Formula (IV). The weight percent values are based on the total weight of monomeric units used in the precursor polymeric material.

The polymeric sorbent is formed by reacting the precursor polymeric material with a nitrogen-containing compound. The nitrogen-containing compound, which is usually basic, reacts with the anhydride group in the precursor polymeric material. That is, the nitrogen-containing compound reacts with the monomeric units of Formula (II) within the precursor polymeric material. This reaction results in the formation of a covalent bond linking the nitrogen-containing compound to the polymeric material.

The nitrogen-containing compound is ammonia, a compound having a single primary amino group (—$NH_2$), or a compound having two or more groups of formula —NHR where R is hydrogen or alkyl. Suitable alkyl R groups (i.e., an alkyl is a monovalent radical of an alkane) often have 1 to 20 carbon atoms. For example, the alkyl can have at least 1 carbon atom, at least 2 carbon atoms, or at least 4 carbon atoms and can have up to 20 carbon atoms, up to 18 carbon atoms, up to 16 carbon atoms, up to 10 carbon atoms, or up to 6 carbon atoms. In some embodiments, the alkyl has 1 to 10 carbon atoms, 1 to 6 carbon atoms, or 1 to 4 carbon atoms.

The nitrogen-containing compounds having a single primary amino group is a primary amine compound and typically does not include other primary and/or secondary amino groups. That is, there is a single nitrogen-containing group and it is —$NH_2$. The nitrogen-containing compound having at least two amino groups of formula —NHR can have two or more primary amino groups (where R is equal to hydrogen), can have two or more secondary amino groups (where R is equal to an alkyl), or can have at least one primary amino group plus at least one secondary amino group.

Many suitable nitrogen-containing compounds are of Formula (V).

$$R_4NHR_1 \qquad (V)$$

In Formula (V), the group $R_1$ is hydrogen or an alkyl. The group $R_4$ is hydrogen, alkyl, or a group of formula —$R_5$—$NHR_6$, or —(C=NH)—$NH_2$. The group $R_5$ is a covalent bond, an alkylene, an arylene, an aralkylene, a heteroalkylene having one or more oxy (—O—) groups, or a heteroalkylene having one or more —NH— groups. The group $R_6$ is hydrogen, alkyl, or —(C=NH)—$NH_2$.

Formula (V) is equal to ammonia when both $R_1$ and $R_4$ are hydrogen. Formula (V) is equal to a compound having a single primary amino group when $R_1$ is hydrogen and $R_4$ is alkyl. Formula (V) is equal to a compound having two or more groups of formula —NHR when $R_4$ is —$R_5$—$NHR_6$ or when $R_4$ is —(C=NH)—$NH_2$.

Suitable alkyl groups for $R_1$ in Formula (V) can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms.

In some embodiments, $R_4$ in Formula (V) is an alkyl. To be suitable as a nitrogen-containing compound, $R_1$ is equal to hydrogen when $R_4$ is an alkyl. That is, the compound of Formula (V) is a primary amine compound. Suitable alkyl groups for $R_4$ often have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms. Examples of suitable primary amine compounds include, but are not limited to, methylamine, ethylamine, propylamine, butylamine, and cyclohexylamine.

In some embodiments, $R_4$ in Formula (V) is a group of formula —$R_5$—$NHR_6$ and the nitrogen-containing compound is of Formula (V-1).

$$R_6HN-R_5-NHR_1 \qquad (V-1)$$

Such compounds have at least two amino groups of formula —NHR. Suitable alkyl groups for $R_6$ in Formula (V-1) can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms. The group $R_5$ can be a covalent bond (i.e., the nitrogen containing compound is a hydrazine compound), an alkylene (i.e., an alkylene is a divalent radical of an alkane), an arylene, an aralkylene, a heteroalkylene having one or more oxy (—O—) groups, or a heteroalkylene having one or more —NH— groups.

Suitable alkylene $R_5$ groups in Formula (V-1) usually have at least 1 carbon atom, at least 2 carbon atoms, at least 3 carbon atoms, or at least 4 carbon atoms and can have up to 20 carbon atoms, up to 16 carbon atoms, up to 12 carbon atoms, up to 10 carbon atoms, or up to 6 carbon atoms. Some nitrogen-containing compounds are of Formula (V-1) with $R_1$ being hydrogen, $R_5$ being an alkylene, and $R_6$ being hydrogen. Examples of such nitrogen-containing compounds are alkylene diamines such as, for example, methylene diamine, ethylene diamine, propylene diamine, and butylene diamine. Nitrogen-containing compounds of Formula (V-1) having both $R_1$ and $R_6$ equal to alkyl include N,N'-dimethylethylene diamine.

In other embodiments of the compounds of Formula (V-1), the group $R_5$ is a heteroalkylene (i.e., a heteroalkylene is a divalent radical of a heteroalkane, which is an alkane having catenary heteroatoms) having at least one catenary —O— or —NH— group. Stated differently, heteroalkylene $R_3$ groups have one or more groups of formula —$R_a$—[O—$R_b$]$_n$— or —$R_a$—[NH—$R_b$]$_n$ where each $R_a$ and each $R_b$ are independently an alkylene and n is an integer in a range 1 to 50, 1 to 40, 1 to 30, 1 to 20, 1 to 10, 1 to 6, or 1 to 4. Suitable $R_a$ and $R_b$ alkylene groups often have 1 to 10 carbon atoms, 1 to 6 carbon atoms, 1 to 4 carbon atoms, or 1 to 3 carbon atoms. The heteroalkylene often has up to 30 carbon atoms and up to 16 heteroatoms, up to 20 carbon atoms and up to 11 heteroatoms, or up to 10 carbon atoms and up to 6 heteroatoms. Such nitrogen-containing compounds can be represented by Formulas (V-2) and (V-3).

$$R_6HN-R_a-[O-R_b]_n-NHR_1 \qquad (V-2)$$

$$R_6HN-R_a-[NH-R_b]_n-NHR_1 \qquad (V-3)$$

Some nitrogen-containing compounds are of Formula (V-2) with $R_1$ being hydrogen, $R_5$ being a heteroalkylene with —O— groups, and $R_6$ being hydrogen. Examples of such nitrogen-containing compounds are poly(alkylene oxide) diamines such as polyethylene glycol diamine and polypropylene glycol diamine. Further nitrogen-containing compounds are of Formula (V-3) with $R_1$ being hydrogen, $R_5$ being a heteroalkylene with —NH— groups, and $R_6$ being hydrogen. Such nitrogen-containing compounds can be, for example, compounds of formula $H_2N-[(CH_2)_xNH]_y-(CH_2)_xNH_2$ where x is an integer in a range of 1 to 4 and y is in a range of 1 to 10. Examples include diethylene triamine, triethylene tetramine, and tetraethylene pentamine.

The $R_5$ group in Formula (V-1) can also be an arylene or aralkylene group. Suitable arylene (i.e., divalent radical of a carbocylic aromatic compound) $R_5$ groups typically have 6 to 12 carbon atoms and are often phenylene or diphenylene. Suitable aralkylene $R_5$ groups refer to divalent groups that have an alkylene substituted by an aryl group, an arylene substituted with an alkyl group, or an arylene bonded to an alkylene group. The alkylene or alkyl portion of the aralkylene often has 1 to 10 carbon atoms, 1 to 6 carbon atoms, or 1 to 4 carbon atoms. The aryl or arylene portion of the aralkylene often has 6 to 12 carbon atoms and is often either phenyl or phenylene. Example nitrogen-containing compounds of Formula (V-1) with both $R_1$ and $R_6$ being hydrogen and $R_5$ being arylene include, but are not limited to, phenylene diamine.

Yet other nitrogen-containing compounds are of Formula (V-1) with $R_6$ being —(C=NH)—$NH_2$ as shown in Formula (V-4).

$$NH_2-(C=NH)-HN-R_5-NHR_1 \qquad (V-4)$$

For example, in some compounds, $R_1$ is hydrogen and $R_5$ is alkylene. One such compound is agmatine. Agmatine can be represented by other resonance structures as well but is considered to be within the scope of both Formula (V-1) and (V-4).

In other embodiments of Formula (V), $R_4$ is a group —(C=NH)—$NH_2$. The resulting compounds are of Formula (V-5).

$$H_2N-(C=NH)-NHR_1 \qquad (V-5)$$

This compound is guanidine when $R_1$ is hydrogen.

Other suitable nitrogen-containing compounds are polyamines having at least three groups of formula $NHR_1$ where $R_1$ is hydrogen or alkyl. Such compounds can be of Formula (VI).

$$R_7-(NHR_1)_z \quad \text{(VI)}$$

In Formula (VI), $R_1$ is defined as above and the variable z is equal to at least 3 and can be up to 10, up to 8, up to 6, or up to 4. The $R_7$ group is often a z-valent radical of an alkane or a z-valent radical of a heteroalkane. Suitable z-valent radicals of alkanes often have a branching carbon atom with at least three of the four adjacent groups being —$CH_2$—. Suitable z-valent radicals of heteroalkanes often have a branching nitrogen atom with three adjacent carbon atoms (e.g., three adjacent groups that are alkylene or alkyl groups) or a branching carbon atom with at least three of the four adjacent atoms being carbon (e.g., three adjacent groups that are alkylene or alkyl groups). These z-valent radicals of heteroalkanes often include one or more groups of formula —$R_c$—[NH—$R_d$]$_p$— where each $R_c$ and each $R_d$ are independently an alkylene and p is an integer in a range 1 to 50, 1 to 40, 1 to 30, 1 to 20, 1 to 10, 1 to 6, or 1 to 4. Suitable $R_c$ and $R_d$ alkylene groups often have 1 to 10 carbon atoms, 1 to 6 carbon atoms, 1 to 4 carbon atoms, or 1 to 3 carbon atoms. The z-valent radicals of alkanes often have at least 2 carbon atoms, at least 3 carbon atoms, at least 4 carbon atoms, or at least 5 carbon atoms and up to 20 carbon atoms, up to 16 carbon atoms, up to 12 carbon atoms, or up to 8 carbon atoms. The z-valent radicals of heteroalkanes often have up to 30 carbon atoms and up to 16 heteroatoms, up to 20 carbon atoms and up to 11 heteroatoms, or up to 10 carbon atoms and up to 6 heteroatoms.

Specific polyamines of formula $R_7$—$(NHR_1)_z$ include various polyimines. Some polyimines include one or more branching nitrogen atoms with each nitrogen-branching atom connected to three groups of formula —$R_c$—[NH—$R_d$]$_p$—. The end group of each branched segment is often a group of formula —$NHR_1$ such as —$NH_2$. Examples include various branched polyethyleneimines. Another specific polyamine is 2-(aminomethyl)-2-methyl-1,3-propanediamine where $R_7$ is a trivalent radical of an alkane (i.e., the carbon branching atom is connected to four carbon atoms with three adjacent alkylene groups and one adjacent methyl group), each $R_1$ is hydrogen, and z is equal to 3.

In many embodiments, the nitrogen-containing compounds such as those of Formula (V) (including Formula V-1 to V-5) and Formula (VI) have a molecular weight (or weight average molecular weight) that is no greater than 2000 Daltons (Da). For example, the molecular weight (or weight average molecular weight) is no greater than 1500 Da, no greater than 1000 Da, no greater than 750 Da, no greater than 500 Da, or no greater than 250 Da.

The nitrogen-containing compound reacts with the monomeric units of Formula (II) in the precursor polymeric material. This reaction results in the covalent bonding of the nitrogen-containing compound to the polymeric material with the reaction sites being the anhydride group (—(CO)—O—(CO)—) in the monomeric unit of Formula (II). The ring structure is typically opened, forming monomeric units of Formula (VII), Formula (VIII), or a mixture thereof.

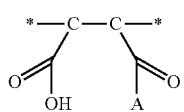

(VII)

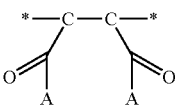

(VIII)

In Formula (VII) and (VIII), group A is equal to —$NR_1R_4$ if a nitrogen-containing compound of Formula (V) is used and is equal to —$NR_1$—$R_7(NHR_1)_{z-1}$ if a nitrogen-containing compound of Formula (VI) is used. Alternatively, a ring structure could possibly form such as shown in Formula (IX) where $A_1$ is a divalent group and is equal to the compound of Formula (V) or to the compound of Formula (VI) minus two hydrogen atoms.

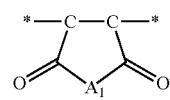

(IX)

Up to two moles of nitrogen-containing compound could be added for every mole of monomeric units of Formula (II) in the precursor polymeric material. That is, up to 200 mole percent nitrogen-containing compound can react with the precursor polymeric material based on the total moles of monomeric units of Formula (II). In some embodiments, the amount of nitrogen-containing compound added is up to 175 mole percent, up to 150 mole percent, up to 125 mole percent, or up to 100 mole percent based on the total moles of monomeric units of Formula (II) in the precursor polymeric material. The amount of the nitrogen-containing compound can be at least 1 mole percent, at least 2 mole percent, at least 5 mole percent, at least 10 mole percent, at least 20 mole percent, at least 50 mole percent, at least 75 mole percent, or at least 100 mole percent based on the total moles of monomeric units of Formula (II) in the precursor polymeric material. In some embodiments, the amount of nitrogen-containing compound is in a range of 1 to 200 mole percent, in a range of 10 to 200 mole percent, in a range of 50 to 200 mole percent, in a range of 50 to 150 mole percent, a range of 75 to 150 mole percent, in a range of 75 to 125 mole percent, or in a range of 100 to 200 mole percent based on the total moles of monomeric units of Formula (II) in the precursor polymeric material.

To react the nitrogen-containing compound with the precursor polymeric material, the nitrogen-containing compound is often dissolved in water and/or a suitable organic solvent. Suitable organic solvents are those that dissolve but do not react with the nitrogen-containing compound. Exemplary organic solvents include, but are not limited to, alcohols, ethers such as tetrahydrofuran and diethyl ether, and various chlorinated solvents such as methylene chloride and chloroform. The concentration of the nitrogen-containing compound in water and/or organic solvent can be any suitable amount depending on the solubility of the nitrogen-containing compound. In some embodiments, the concentration of the nitrogen-containing compound in water and/or organic solvent is in a range of 1 to 40 weight percent, in a range of 1 to 30 weight percent, in a range of 1 to 20 weight percent, or in a range of 1 to 10 weight percent.

The solution of the nitrogen-containing compound is mixed with the precursor polymeric material. The reaction between the nitrogen-containing compounds can occur at room temperature or can occur by heating the mixture to a temperature above room temperature. For example, the mixture can be heated at temperatures in a range of 30° C. to 120° C. for several hours to several days. In some embodiments, the suspension is heated at 30° C. to 100° C., 40° C. to 90° C., 50° C. to 90° C., or 60° C. to 80° C. for 12 to 24 hours.

The polymeric sorbent typically has a BET specific surface area that is less than that of the precursor polymeric material. The opening of the anhydride group to form the monomeric units of Formula (VII) and (VIII) may sufficiently increase the conformational freedom in the backbone resulting in decreased porosity. In addition, hydrogen bonding between the nitrogen-containing groups in the monomeric units of Formula (VII), (VIII), and (IX) could possibly restrict or block access to pores. Because of this decrease, it is often desirable to prepare a precursor polymeric material having the highest possible BET specific surface area, yet having sufficient anhydride groups to react with the nitrogen-containing compound.

The polymeric sorbent typically has a BET specific surface area equal to at least 25 m$^2$/gram. In some embodiments, the BET specific surface area is at least 50 m$^2$/gram, at least 75 m$^2$/gram, or at least 100 m$^2$/gram. The BET specific surface area can be up to 700 m$^2$/gram or higher, up to 600 m$^2$/gram, up to 500 m$^2$/gram, up to 400 m$^2$/gram, up to 300 m$^2$/gram, or up to 200 m$^2$/gram. In some embodiments, the BET specific surface area is in a range of 25 to 600 m$^2$/gram, in a range of 25 to 500 m$^2$/gram, in a range of 25 to 400 m$^2$/gram, in a range of 25 to 300 m$^2$/gram, in a range of 50 to 300 m$^2$/gram, in a range of 50 to 200 m$^2$/gram, in a range of 75 to 200 m$^2$/gram, or in a range of 50 to 100 m$^2$/gram.

Figure 2:
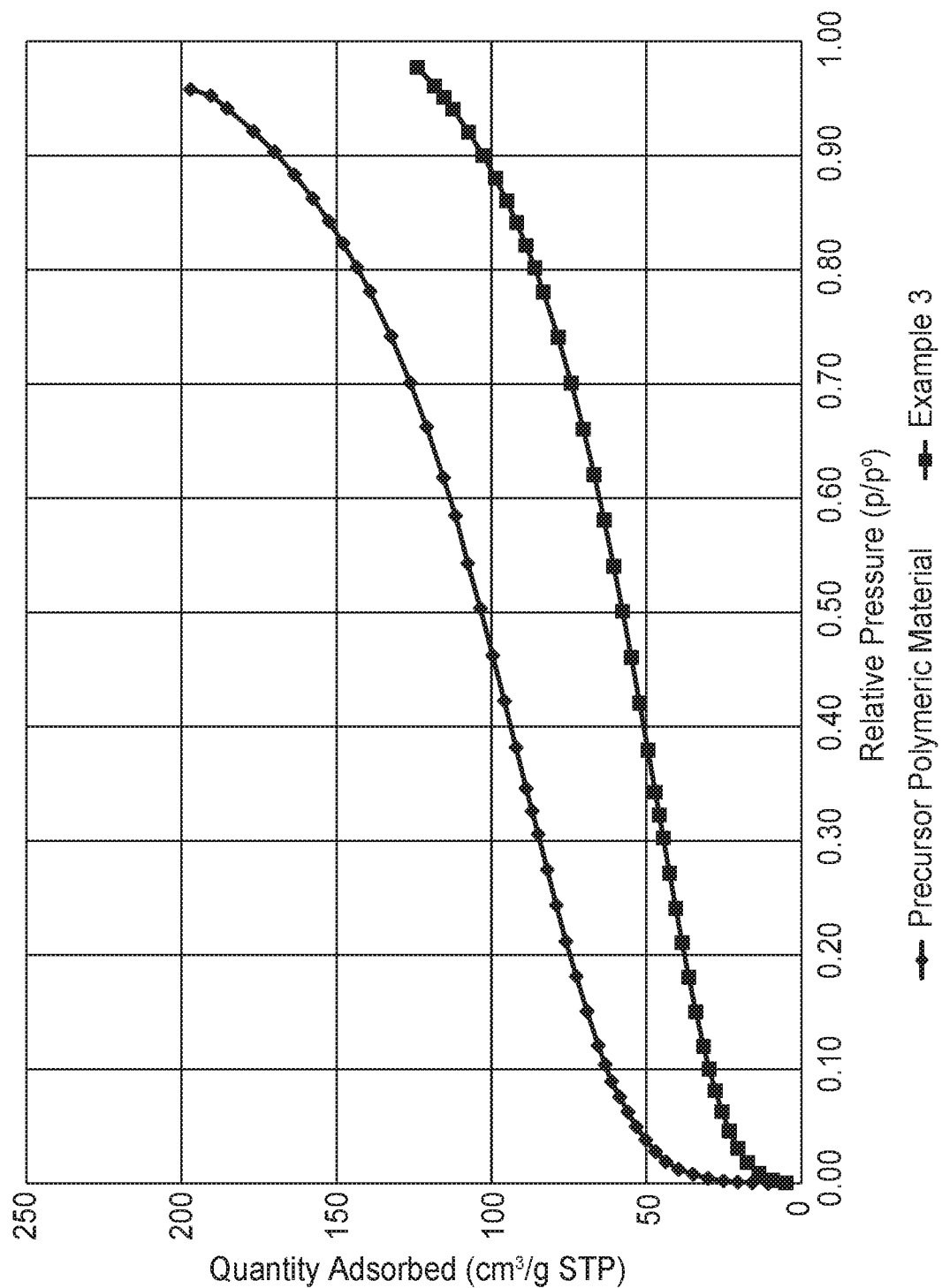
FIG. 2 is the argon adsorption isotherms at 77° K and at relative pressures up to 0.98±0.01 for the polymeric sorbent of Example 12 and the precursor polymeric material from which it was prepared.

The BET specific surface area is at least partially attributable to the presence of micropores and/or mesopores in the polymeric sorbent. The argon adsorption isotherms (at 77° K) of the polymeric sorbent indicate that there is considerable adsorption of argon at relative pressures below 0.1, which suggests that micropores are present. There is a gradual increase in adsorption at relative pressures between 0.1 and about 0.95. This increase is indicative of a wide size distribution of mesopores. Argon adsorption isotherms are shown in FIG. 1 and FIG. 2 for the polymeric sorbents of Examples 3 and 12 and the precursor polymeric materials from which they were prepared.

In some embodiments, at least 20 percent of the BET specific surface area of the polymeric sorbent is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent or higher, or up to 75 percent or higher.

The porous polymeric sorbent has a total pore volume equal to at least 0.05 cm$^3$/gram. Total pore volume is calculated from the amount of argon adsorbed at liquid nitrogen temperature (77° K) at a relative pressure (p/p°) equal to approximately 0.98 (e.g., 0.98±0.01). In some embodiments, the total pore volume is at least 0.075 cm$^3$/gram, at least 0.10 cm$^3$/gram, at least 0.15 cm$^3$/gram, at least 0.20 cm$^3$/gram, at least 0.25 cm$^3$/gram, or at least 0.30 cm$^3$/gram. The total pore volume can be up to 1.0 cm$^3$/gram or even higher, up to 0.9 cm$^3$/gram, up to 0.8 cm$^3$/gram, up to 0.7 cm$^3$/gram, up to 0.6 cm$^3$/gram, or up to 0.5 cm$^3$/gram, up to 0.4 cm$^3$/gram, up to 0.3 cm$^3$/gram, or up to 0.2 cm$^3$/gram. The pore volume is often in a range of 0.05 to 1 cm$^3$/gram, in a range of 0.05 to 0.8 cm$^3$/gram, in a range of 0.05 to 0.6 cm$^3$/gram, in a range of 0.05 to 0.4 cm$^3$/gram, in a range of 0.05 to 0.2 cm$^3$/gram, or in a range of 0.75 to 0.2 cm$^3$/gram.

The structure of the divinylbenzene/maleic anhydride polymeric material is particularly well suited for use as a precursor polymeric material for the porous polymeric sorbent. Providing that the content of monomeric units of Formula (IV) from styrene-type monomers are low, the divinylbenzene/maleic anhydride precursor polymeric material has alternating monomeric units from divinylbenzene and maleic anhydride. This structure results in high cross-linking and contributes to the formation of a porous polymeric material, particularly a porous polymeric material having a high content of micropores and/or mesopores.

In some embodiments, the polymeric sorbent further includes an acid-base indicator. The acid-base colorimetric indicator (i.e., a dye (typically an organic dye) that changes color when it undergoes a transition from being in an acidic form to being in a basic form) can be added at the same time as the nitrogen-containing compound or can be added after addition of the nitrogen-containing compound. The acid-base colorimetric indicator is typically selected to have a $pK_b$ that is less than a $pK_b$ of the nitrogen-containing compound. That is, the acid-base colorimetric indicator is selected to change from a first color to a second color when all or a significant portion of the available nitrogen-containing groups on the polymeric sorbent have reacted with an aldehyde. The change in color signals that the capacity of the polymeric sorbent for sorption of an aldehyde has been reached or is close to being reached. As used herein, the term "close to being reached" means that at least 60 percent or more of the capacity has been reached (i.e., a least 60 percent or more of the available sorption sites have been used for sorption of an aldehyde). For example, at least 70 percent, at least 80 percent, at least 90 percent, or at least 95 percent of the sorption sites have been used for sorption of an aldehyde.

Knowing the $pK_b$ of the nitrogen-containing compound, one of skill in the art can readily select an acid-base colorimetric indicator that has a lower $pK_b$ value. In some applications, the difference between the $pK_b$ value of the nitrogen-containing compound and the $pK_b$ of the acid-base colorimetric indicator is at least 1, at least 2, at least 3, or at least 4. The $pK_b$ of the acid-base colorimetric indicator is often in a range of 3 to 10.

Example acid-base colorimetric indicators include, but are not limited to, methyl red, bromoxylenol blue, pararosaniline, chrysoidine, thymol blue, methyl yellow, bromophenyl blue, Congo red, methyl orange, bromocresol green, azolitmin, bromocresol purple, bromothymol blue, phenol red, neutral red, naphtholphthalein, cresol red, phenolphthalein, and thymolphthalein.

The acid-base colorimetric indicators can be added to the polymeric sorbent using any suitable method. In some embodiments, the polymeric sorbent is soaked in a solution of the acid-base colorimetric indicator for at least 10 minutes, at least 20 minutes, at least 30 minutes, at least 1 hour, at least 2 hours, at least 4 hours, or at least 8 hours. The solution of the acid-base colorimetric indicator is often in a concentration range of 5 to 10 milligrams per milliliter. Often, about 0.5 grams of the polymeric sorbent is soaked in about 10 milliliters of the solution.

The polymeric sorbents offer a distinct advantage over sorbents based on impregnation of a capture agent. The capture agents are typically simply sorbed on the matrix material such as, for example, activated carbon. That is, the capture agents are usually not covalently attached to the matrix material and can migrate. In contrast, the polymeric sorbents described herein have covalently attached nitrogen-containing groups that interact with the aldehyde and that do not migrate.

In another aspect, a method of sorbing an aldehyde on a polymeric sorbent is provided. The method includes providing a polymeric sorbent and then sorbing the aldehyde on the polymeric sorbent. The polymeric sorbent is a reaction product of (a) a precursor polymeric material and (b) a nitrogen-containing compound. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The nitrogen-containing compound that is selected from ammonia, a compound having a single primary amino group (—$NH_2$), or a compound having at least two amino groups of formula —NHR where R is hydrogen or alkyl. Suitable nitrogen-containing compounds are typically of Formula (V) and (VI) as described above.

The porous polymeric sorbent sorbs aldehydes. Suitable aldehydes are of Formula (I)

$R_2$—(CO)—H          (I)

where $R_2$ is hydrogen, alkyl, vinyl, aryl, or aryl substituted with an alkyl. Suitable alkyl groups typically have 1 to 10 carbon atoms, 1 to 6 carbon atoms, 1 to 4 carbon atoms, 1 to 3 carbon atoms, or 1 carbon atom. The aryl group can have up to 12 carbon atoms or up to 6 carbon atoms. The aryl group is often phenyl. The aryl group can be substituted with an alkyl group such as an alkyl group having 1 to 4 carbon atoms or 1 to 3 carbon atoms.

The aldehyde is sorbed by the polymeric sorbent when it is in the form of a vapor. Thus, the molecular weight of the aldehyde is typically no greater than 200 grams/mole, no greater than 150 grams/mole, no greater than 100 grams/mole, no greater than 75 grams/mole, or no greater than 50 grams/mole. Suitable aldehydes include, but are not limited to formaldehyde, acetaldehyde, propionaldehyde, butyraldehyde, pentanal (valeraldehyde), isovaleraldehyde, hexanal, benzaldehyde, 2,5-dimethylbenzaldehyde, 2,4-dimethylbenzaldehyde, 2,3-dimethylbenzaldehyde, tolualdehydes (ortho-tolualdehyde, meta-tolualdehyde, para-tolualdehyde, and mixtures thereof), acrolein and crotonaldehyde.

The aldehyde can be sorbed at room temperature or at any desired temperature such as in a range of –30° C. to 150° C., –30° C. to 100° C., or in a range of –20° C. to 50° C.

In another aspect, a composition is provided that includes the porous polymeric sorbent and an aldehyde sorbed on the porous polymeric sorbent. The polymeric sorbent and the aldehyde are the same as described above. The aldehyde can react with any primary amino group or secondary amino group present on the polymeric sorbent.

In some embodiments, the polymeric sorbent is formed using a compound of Formula (V) as the nitrogen-containing compound.

$R_4NHR_1$          (V)

If $R_4$ is hydrogen, the polymeric sorbent contains nitrogen-containing groups of formula —$NHR_1$. When such a polymeric sorbent having $R_1$ groups equal to hydrogen is exposed to an aldehyde $R_2$—(CO)—H, the resulting polymeric material can have groups of formula —NH—$CHR_2$—OH, —N($CHR_2$—OH)$_2$, —N=$CR_2$H, or a combination thereof. When such a polymeric sorbent having $R_1$ groups equal to an alkyl is exposed to an aldehyde $R_2$—(CO)—H the resulting polymeric material can have groups of formula —$NR_1$—$CHR_2$—OH.

In other embodiments, the polymeric sorbent is formed using a compound of Formula (V-1) as the nitrogen-containing compound.

$R_6HN$—$R_5$—$NHR_1$          (V-1)

The resulting polymeric sorbent can have nitrogen-containing groups of formula —$NR_6$—$R_5$—$NHR_1$, —$NR_1$—$R_5$—$NHR_6$, or both. If the terminal $R_1$ of the group of formula —$NR_6$—$R_5$—$NHR_1$ is hydrogen, the polymeric sorbent after exposure to the aldehyde $R_2$—(CO)—H can have groups of formula —$NR_6$—$R_5$—NH—$CHR_2$—OH, —$NR_6$—$R_5$—N($CHR_2$—OH)$_2$, —$NR_6$—$R_5$—N=$CR_2$H, or a mixture thereof. Likewise, if the terminal $R_6$ of the group of formula —$NR_1$—$R_5$—$NHR_6$ is hydrogen, the polymeric sorbent after exposure to the aldehyde $R_2$—(CO)—H can have groups of formula —$NR_1$—$R_5$—NH—$CHR_2$—OH, —$NR_1$—$R_5$—N($CHR_2$—OH)$_2$, —$NR_1$—$R_5$—N=$CR_2$H, or a mixture thereof. If the terminal $R_1$ of the group of formula —$NR_6$—$R_5$—$NHR_1$ is alkyl, the polymeric sorbent after exposure to the aldehyde $R_2$—(CO)—H can have groups of formula —$NR_6$—$R_5$—$NR_1$—$CHR_2$—OH. Likewise, if the terminal $R_6$ of the group of formula —$NR_1$—$R_5$—$NHR_6$ is alkyl, the polymeric sorbent after exposure to the aldehyde $R_2$—(CO)—H can have groups of formula —$NR_1$—$R_5$—$NR_6$—$CHR_2$—OH. Additional amounts of aldehyde can react with any remaining primary amino group or secondary amino group.

In yet other embodiments, the polymeric sorbent is formed using a compound of Formula (V-4) as the nitrogen-containing compound.

$NH_2$—(C=NH)—HN—$R_5$—$NHR_1$          (V-4)

The resulting polymeric sorbent can have nitrogen-containing groups of formula —NH—(C=NH)—NH—$R_5$—$NHR_1$, —$NR_1$—$R_5$—NH—(C=NH)—$NH_2$, or both. If the terminal $R_1$ of the group of formula —NH—(C=NH)—NH—$R_5$—$NHR_1$ is hydrogen, the polymeric sorbent after exposure to the aldehyde $R_2$—(CO)—H can have groups of formula —NH—(C=NH)—NH—$R_5$—NH—$CHR_2$—OH, —NH—(C=NH)—NH—$R_5$—N($CHR_2$—OH)$_2$, —NH—(C=NH)—NH—$R_5$—N=$CR_2$H, or a mixture thereof. If the terminal $R_1$ of the group of formula —NH—(C=NH)—NH—$R_5$—$NHR_1$ is an alkyl, the polymeric sorbent after exposure to the aldehyde $R_2$—(CO)—H can have groups of formula —NH—(C=NH)—NH—$R_5$—$NR_1$—$CHR_2$—OH. If the polymeric sorbent has groups of formula —$NR_1$—$R_5$—NH—(C=NH)—$NH_2$, the polymeric sorbent after exposure to the aldehyde $R_2$—(CO)—H can have groups of formula —$NR_1$—$R_5$—NH—(C=NH)—NH—$CHR_2$—OH, —$NR_1$—$R_5$—NH—(C=NH)—N($CHR_2$—OH)$_2$, —$NR_1$—$R_5$—NH—(C=NH)—N=$CR_2$H, or a mixture thereof. Additional amounts of aldehyde can react with any remaining primary amino group or secondary amino group.

In yet further embodiments, the polymeric sorbent is formed using a compound of Formula (V-5)

$H_2N$—(C=NH)—$NHR_1$          (V-5)

as the nitrogen-containing compound. The resulting polymeric sorbent can have nitrogen-containing groups of formula —NH—(C═NH)—NHR$_1$, —NR$_1$—(C═NH)—NH$_2$, or both. If the terminal R$_1$ of the group of formula —NH—(C═NH)—NHR$_1$ is hydrogen, the polymeric sorbent after exposure to the aldehyde R$_2$—(CO)—H can have groups of formula —NH—(C═NH)—NH—CHR$_2$—OH, —NH—(C═NH)—N(CHR$_2$—OH)$_2$, —NH—(C═NH)—N═CR$_2$H, or a mixture thereof. If the terminal R$_1$ of the group of formula —NH—(C═NH)—NHR$_1$ is alkyl, the polymeric sorbent after exposure to the aldehyde R$_2$—(CO)—H can have groups of formula —NH—(C═NH)—NR$_1$—CHR$_2$—OH. If the polymeric sorbent has groups of formula —NR$_1$—(C═NH)—NH$_2$, the polymeric sorbent after exposure to the aldehyde R$_2$—(CO)—H can have groups of formula —NR$_1$—(C═NH)—NH—CHR$_2$—OH, —NR$_1$—(C═NH)—N(CHR$_2$—OH)$_2$, —NR$_1$—(C═NH)—N═CR$_2$H, or a mixture thereof. Additional amounts of aldehyde can react with any remaining primary amino group or secondary amino group.

In still further embodiments, the polymeric sorbent is formed using a compound of Formula (VI) as the nitrogen-containing compound.

R$_7$—(NHR$_1$)$_z$  (VI)

The resulting polymeric sorbent can have nitrogen-containing groups of formula —NR$_1$—R$_7$—(NHR$_1$)$_{z-1}$. If one of the terminal R$_1$ of the group of formula —NR$_1$—R$_7$—(NHR$_1$)$_{z-1}$ is hydrogen, the polymeric sorbent after exposure to the aldehyde R$_2$—(CO)—H can have groups of formula —NR$_1$—R$_7$—(NHR$_1$)$_{z-2}$(NH—CHR$_2$OH), —NR$_1$—R$_7$—(NHR$_1$)$_{z-2}$(N(CHR$_2$OH)$_2$), —NR$_1$—R$_7$—(NHR$_1$)$_{z-2}$(N═CR$_2$H), or a mixture thereof. If one of the terminal R$_1$ of the group of formula —NR$_1$—R$_7$—(NHR$_1$)$_{z-1}$ is alkyl, the polymeric sorbent after exposure to the aldehyde R$_2$—(CO)—H can have groups of formula —NR$_1$—R$_7$—(NHR$_1$)$_{z-2}$(NR$_1$—CHR$_2$OH). In some of these embodiments, more than one terminal —NHR$_1$ group can react with the aldehyde. In addition to the terminal groups, the aldehyde can react with any other primary and/or secondary amino group on the polymeric sorbent.

The amount of aldehyde sorbed by the polymeric sorbent at room temperature (e.g., 25° C.) and standard pressure is often at least 0.5 mmoles/gram (i.e., at least 0.5 mmoles of aldehyde per gram of polymeric sorbent). For example, the amount of aldehyde sorbed can be at least 1 mmole/gram, at least 1.5 mmoles/gram, at least 2 mmoles/gram, at least 2.5 mmoles/gram, at least 3 mmoles/gram, at least 3.5 mmoles/gram, at least 4 mmoles/gram, at least 4.5 mmoles/gram, or at least 5 mmoles/gram. The amount sorbed can be up to 12 mmoles/gram or even higher, up to 10 mmoles/gram, up to 9 mmoles/gram, up to 8 mmoles/gram, or up to 7 mmoles/gram. The amount sorbed is often in a range of 0.5 to 12 mmoles/gram, in a range of 1 to 12 mmoles/gram, in a range of 2 to 12 mmoles/gram, in a range of 1 to 10 mmoles/gram, in a range of 2 to 10 mmoles/gram, in a range of 3 to 12 mmoles/gram, in a range of 3 to 10 mmoles/gram, or in a range of 3 to 8 mmoles/gram.

Various embodiments are provided that are a polymeric sorbent, a method of preparing a polymeric sorbent, a method of sorbing aldehyde on a polymeric sorbent, or a composition comprising a polymeric sorbent and aldehyde sorbed on the polymeric sorbent.

Embodiment 1A is a polymeric sorbent that is a reaction product of (a) a precursor polymeric material and (b) a nitrogen-containing compound. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia, a compound having a single primary amino group (—NH$_2$), or a compound having at least two amino groups of formula —NHR where R is hydrogen or alkyl.

Embodiment 2A is the polymeric sorbent of embodiment 1A, wherein the polymerizable composition comprises 15 to 65 weight percent maleic anhydride, 30 to 85 weight percent divinylbenzene, and 0 to 40 weight percent of a styrene-type monomer based on the total weight of monomers in the polymerizable composition.

Embodiment 3A is the polymeric sorbent of embodiment 1A or 2A, wherein the polymerizable composition comprises 25 to 65 weight percent maleic anhydride, 30 to 75 weight percent divinylbenzene, and 1 to 20 weight percent styrene-type monomer based on the total weight of monomers in the polymerizable composition.

Embodiment 4A is the polymeric sorbent of any one of embodiments 1A to 3A, wherein the polymerizable composition comprises 30 to 65 weight percent maleic anhydride, 30 to 70 weight percent divinylbenzene, and 1 to 20 weight percent styrene-type monomer based on the total weight of monomers in the polymerizable composition.

Embodiment 5A is the polymeric sorbent of any one of embodiments 1A to 4A, wherein the nitrogen-containing compound has a molecular weight no greater than 2000 Daltons.

Embodiment 6A is the polymeric sorbent of any one of embodiments 1A to 5A, wherein the nitrogen-containing compound is of Formula (V).

R$_4$NHR$_1$  (V)

In Formula (V), R$_1$ is hydrogen or an alkyl; R$_4$ is hydrogen, an alkyl, a group of formula —R$_5$—NHR$_6$, or —(C═NH)—NH$_2$; R$_5$ is a covalent bond, an alkylene, an arylene, an aralkylene, a heteroalkylene having one or more oxy (—O—) groups, or a heteroalkylene having one or more —NH— groups; and R$_6$ is hydrogen, alkyl, or —(C═NH)—NH$_2$.

Embodiment 7A is the polymeric sorbent of embodiment 6A, wherein R$_4$ is alkyl.

Embodiment 8A is the polymeric sorbent of embodiment 7A, wherein R$_4$ has 1 to 6 carbon atoms or 1 to 4 carbon atoms.

Embodiment 9A is the polymeric sorbent of embodiment 6A, wherein the nitrogen-containing compound of Formula (V) is of Formula (V-1).

R$_6$HN—R$_5$—NHR$_1$  (V-1)

In Formula (V-1), R$_1$ is hydrogen or an alkyl; R$_5$ is a covalent bond, an alkylene, an arylene, an aralkylene, a heteroalkylene having one or more oxy (—O—) groups, or a heteroalkylene having one or more —NH— groups; and R$_6$ is hydrogen, alkyl, or —(C═NH)—NH$_2$.

Embodiment 10A is the polymeric sorbent of embodiment 9A, wherein R$_5$ is a covalent bond and the nitrogen-containing compound is a hydrazine.

Embodiment 11A is the polymeric sorbent of embodiment 9A, wherein R$_5$ is an alkylene and the nitrogen-containing compound is an alkylene diamine. Example alkylene diamines include, but are not limited to, methylene diamine, ethylene diamine, propylene diamine, butylene diamine, and N,N'-dimethylethylene diamine.

Embodiment 12A is the polymeric sorbent of embodiment 9A, wherein $R_5$ is a heteroalkylene and the nitrogen-containing compound is of Formula (V-2) or Formula (V-3).

$$R_6HN-R_a-[O-R_b]_n-NHR_1 \quad (V-2)$$

$$R_6HN-R_a-[NH-R_b]_n-NHR_1 \quad (V-3)$$

In these formulas, $R_a$ is an alkylene; $R_b$ is an alkylene; and n is an integer in a range of 1 to 50.

Embodiment 13A is the polymeric sorbent of embodiment 12A, wherein the nitrogen-containing compound is of Formula (V-2) and is a polyethylene glycol diamine or a polypropylene glycol diamine.

Embodiment 14A is the polymeric sorbent of embodiment 12A, wherein the nitrogen-containing compound is of Formula (V-3) and is diethylene triamine, triethylene tetramine, or tetraethylene pentamine.

Embodiment 15A is the polymeric sorbent of embodiment 9A, wherein the nitrogen-containing compound of Formula (V-1) is of Formula (V-4)

$$NH_2-(C=NH)-HN-R_5-NHR_1 \quad (V-4)$$

wherein $R_5$ is an alkylene.

Embodiment 16A is the polymeric sorbent of embodiment 15A, wherein the nitrogen-containing compound is agmatine.

Embodiment 17A is the polymeric sorbent of embodiment 6A, wherein the nitrogen-containing compound of Formula (V) is of Formula (V-5).

$$H_2N-(C=NH)-NHR_1 \quad (V-5)$$

Embodiment 18A is the polymeric sorbent of embodiment 17A, wherein the nitrogen-containing compound is guanidine.

Embodiment 19A is the polymeric sorbent of embodiment 9A, wherein $R^5$ is an arylene. An example nitrogen-containing compound is phenylene diamine.

Embodiment 20A is the polymeric sorbent of any one of embodiment 1A to 5A, wherein the nitrogen-containing compound is of Formula (VI).

$$R_7-(NHR_1)_z \quad (VI)$$

In Formula (VI), $R_7$ is a z-valent radical of an alkane or a z-valent radical of a heteroalkane; and y is an integer in a range of 3 to 10.

Embodiment 21A is the polymeric sorbent of any one of embodiments 1A to 5A, wherein the polymeric sorbent has nitrogen-containing groups of formula —$NHR_1$ wherein $R_1$ is hydrogen or alkyl.

Embodiment 22A is the polymeric sorbent of any one of embodiments 1A to 5A, wherein the polymeric sorbent has nitrogen-containing groups of formula —$NR_6$—$R_5$—$NHR_1$, —$NR_1$—$R_5$—$NHR_6$, or both. Group $R_1$ is hydrogen or an alkyl; $R_5$ is a covalent bond, an alkylene, an arylene, an aralkylene, a heteroalkylene having one or more oxy (—O—) groups, or a heteroalkylene having one or more —NH— groups; and $R_6$ is hydrogen or alkyl.

Embodiment 23A is the polymeric sorbent of any one of embodiments 1A to 5A, wherein the polymeric sorbent has nitrogen-containing groups of formula —NH—(C=NH)—NH—$R_5$—$NHR_1$, —$NR_1$—$R_5$—NH—(C=NH)—$NH_2$, or both. Group $R_1$ is hydrogen or an alkyl; and $R_5$ is a covalent bond, an alkylene, an arylene, an aralkylene, a heteroalkylene having one or more oxy (—O—) groups, or a heteroalkylene having one or more —NH— groups.

Embodiment 24A is the polymeric sorbent of any one of embodiments 1A to 5A, wherein the polymeric sorbent has nitrogen-containing groups of formula —NH—(C=NH)—$NHR_1$, —$NR_1$—(C=NH)—$NH_2$, or both. Group $R_1$ is hydrogen or an alkyl.

Embodiment 25A is the polymeric sorbent of any one of embodiments 1A to 5A, wherein the polymeric sorbent has nitrogen-containing groups of formula —$NR_1$—$R_7$—$(NHR_1)_{z-1}$. Group $R_1$ is hydrogen or alkyl; $R_7$ is a z-valent radical of an alkane or of a heteroalkane; and z is an integer in a range of 3 to 10.

Embodiment 26A is the polymeric sorbent of any one of embodiments 1A to 25A, wherein the polymeric sorbent further comprising an acid-base dye.

Embodiment 27A is the polymeric sorbent of embodiment 26A, wherein the acid-base dye has a lower $pK_b$ than the nitrogen-containing compound.

Embodiment 28A is the polymeric sorbent of embodiment 26A or 27A, wherein a difference between the $pK_b$ of the nitrogen-containing compound and the $pK_b$ of the acid-base dye is equal to at least 2.

Embodiment 29A is the polymeric sorbent of any one of embodiments 1A to 28A, wherein the polymeric sorbent has a BET specific surface area equal to at least 25 $m^2$/gram.

Embodiment 1B is a method of sorbing an aldehyde on a polymeric sorbent. The method includes providing a polymeric sorbent of any one of embodiments 1A to 29A and sorbing an aldehyde on the polymeric sorbent. The aldehyde is of Formula (I)

$$R_2-(CO)-H \quad (I)$$

wherein $R_2$ is hydrogen, alkyl, vinyl, or aryl. The molecular weight of the aldehyde of Formula (I) is no greater than 200 grams/mole.

Embodiment 2B is the method of embodiment 1B, wherein $R_2$ is hydrogen (the aldehyde is formaldehyde) or methyl (the aldehyde is acetaldehyde).

Embodiment 3B is the method of embodiment 1B or 2B, wherein the polymeric sorbent sorbs an amount of aldehyde in a range of 0.5 to 12 millimoles per gram based on the weight of the polymeric sorbent.

Embodiment 4B is the method of any one of embodiments 1B to 3B, wherein the polymeric sorbent has a BET specific surface area equal to at least 25 $m^2$/gram.

Embodiment 5B is the method of any one of embodiments 1B to 4B, wherein the polymeric sorbent comprises an acid-base dye and wherein the acid-base dye changes color when the aldehyde sorption capacity of the polymeric sorbent is reached or is close to being reached.

Embodiment 1C is a composition comprising (a) a polymeric sorbent of any one of embodiments 1A to 29A and (b) an aldehyde sorbed on the polymeric sorbent. The aldehyde is of Formula (I).

$$R_2-(CO)-H \quad (I)$$

In Formula (I), $R_2$ is hydrogen, alkyl, vinyl, or aryl. The molecular weight of the aldehyde of Formula (I) is no greater than 200 grams/mole.

Embodiment 2C is the composition of embodiment 1C, wherein $R_2$ is hydrogen (the aldehyde is formaldehyde) or methyl (the aldehyde is acetaldehyde).

Embodiment 3C is the composition of embodiment 1C or 2C, wherein the polymeric sorbent sorbs an amount of aldehyde in a range of 0.5 to 12 millimoles per gram based on the weight of the polymeric sorbent.

Embodiment 4C is the composition of any one of embodiments 1C to 3C, wherein the polymeric sorbent has a BET specific surface area equal to at least 25 m²/gram.

Embodiment 5C is the composition of any one of embodiments 1C to 4C, wherein the polymeric sorbent comprises an acid-base dye and wherein the acid-base dye changes color when the aldehyde sorption capacity of the polymeric sorbent is reached or is close to being reached.

Embodiment 1D is a method of preparing a polymeric sorbent. The method includes providing a precursor polymeric material. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The method further includes treating the precursor polymeric material with a nitrogen-containing compound that is selected from ammonia, a compound having a single primary amino group (—NH₂), or a compound having at least two amino groups of formula —NHR where R is hydrogen or alkyl. The method further includes reacting the precursor polymeric material with a nitrogen-containing compound that is selected from ammonia, a compound having a single primary amino group (—NH₂), or a compound having at least two amino groups of formula —NHR where R is hydrogen or alkyl. The reaction results in the formation of the polymeric sorbent having a covalently attached nitrogen-containing group.

Embodiment 2D is the method of embodiment 1D, wherein the polymerizable composition comprises 15 to 65 weight percent maleic anhydride, 30 to 85 weight percent divinylbenzene, and 0 to 40 weight percent of a styrene-type monomer based on the total weight of monomers in the polymerizable composition.

Embodiment 3D is the method of embodiment 1D or 2D, wherein the polymerizable comprises 25 to 65 weight percent maleic anhydride, 30 to 75 weight percent divinylbenzene, and 1 to 20 weight percent styrene-type monomer based on the total weight of monomers in the polymerizable composition. Embodiment 4D is the method of any one of embodiments 1D to 3D, wherein the polymerizable composition comprises 30 to 65 weight percent maleic anhydride, 30 to 70 weight percent divinylbenzene, and 1 to 20 weight percent styrene-type monomer based on the total weight of monomers in the polymerizable composition.

Embodiment 5D is the method of any one of embodiments 1D to 4D, wherein the nitrogen-containing compound has a molecular weight no greater than 2000 Daltons.

Embodiment 6D is the method of any one of embodiments 1D to 5D, wherein the nitrogen-containing compound is of Formula (V).

In Formula (V), $R_1$ is hydrogen or an alkyl; $R_4$ is hydrogen, an alkyl, a group of formula —$R_5$—$NHR_6$, or —(C=NH)—NH₂; $R_5$ is a covalent bond, an alkylene, an arylene, an aralkylene, a heteroalkylene having one or more oxy (—O—) groups, or a heteroalkylene having one or more —NH— groups; and $R_6$ is hydrogen, alkyl, or —(C=NH)—NH₂.

Embodiment 7D is the method of embodiment 6D, wherein $R_4$ is alkyl.

Embodiment 8D is the method of embodiment 7D, wherein $R_4$ has 1 to 6 carbon atoms or 1 to 4 carbon atoms.

Embodiment 9D is the method of embodiment 6D, wherein the nitrogen-containing compound of Formula (V) is of Formula (V-1).

In Formula (V-1), $R_1$ is hydrogen or an alkyl; $R_5$ is a covalent bond, an alkylene, an arylene, an aralkylene, a heteroalkylene having one or more oxy (—O—) groups, or a heteroalkylene having one or more —NH— groups; and $R_6$ is hydrogen, alkyl, or —(C=NH)—NH₂.

Embodiment 10D is the method of embodiment 9D, wherein $R_5$ is a covalent bond and the nitrogen-containing compound is a hydrazine.

Embodiment 11D is the method of embodiment 9D, wherein $R_5$ is an alkylene and the nitrogen-containing compound is an alkylene diamine. Example alkylene diamines include, but are not limited to, methylene diamine, ethylene diamine, propylene diamine, butylene diamine, and N,N'-dimethylethylene diamine.

Embodiment 12D is the method of embodiment 9D, wherein $R_5$ is a heteroalkylene and the nitrogen-containing compound is of Formula (V-2) or Formula (V-3).

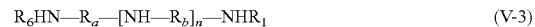

In these formulas, $R_a$ is an alkylene; $R_b$ is an alkylene; and n is an integer in a range of 1 to 50.

Embodiment 13D is the method of embodiment 12D, wherein the nitrogen-containing compound is of Formula (V-2) and is a polyethylene glycol diamine or a polypropylene glycol diamine.

Embodiment 14D is the method of embodiment 12D, wherein the nitrogen-containing compound is of Formula (V-3) and is diethylene triamine, triethylene tetramine, or tetraethylene pentamine.

Embodiment 15D is the method of embodiment 9D, wherein the nitrogen-containing compound of Formula (V-1) is of Formula (V-4)

wherein $R_5$ is an alkylene.

Embodiment 16D is the method of embodiment 15D, wherein the nitrogen-containing compound is agmatine.

Embodiment 17D is the method embodiment 6D, wherein the nitrogen-containing compound of Formula (V) is of Formula (V-5).

Embodiment 18D is the method of embodiment 17D, wherein the nitrogen-containing compound is guanidine.

Embodiment 19D is the method of embodiment 9D, wherein $R_5$ is an arylene. An example nitrogen-containing compound is phenylene diamine.

Embodiment 20D is the method of any one of embodiments 1D to 5D, wherein the nitrogen-containing compound is of Formula (VI).

In Formula (VI), $R_7$ is a z-valent radical of an alkane or a z-valent radical of a heteroalkane; and y is an integer in a range of 3 to 10.

Embodiment 21D is the method of any one of embodiments 1D to 5D, wherein the polymeric sorbent has nitrogen-containing groups of formula —$NHR_1$ wherein $R_1$ is hydrogen or alkyl.

Embodiment 22D is the method of any one of embodiments 1D to 5D, wherein the polymeric sorbent has nitrogen-containing groups of formula —NR$_6$—R$_5$—NHR$_1$, —NR$_1$—R$_5$—NHR$_6$, or both. Group R$_1$ is hydrogen or an alkyl; R$_5$ is a covalent bond, an alkylene, an arylene, an aralkylene, a heteroalkylene having one or more oxy (—O—) groups, or a heteroalkylene having one or more —NH— groups; and R$_6$ is hydrogen or alkyl.

Embodiment 23D is the method of any one of embodiments 1D to 5D, wherein the polymeric sorbent has nitrogen-containing groups of formula —NH—(C=NH)—NH—R$_5$—NHR$_1$, —NR$_1$—R$_5$—NH—(C=NH)—NH$_2$, or both. Group R$_1$ is hydrogen or an alkyl; and R$_5$ is a covalent bond, an alkylene, an arylene, an aralkylene, a heteroalkylene having one or more oxy (—O—) groups, or a heteroalkylene having one or more —NH— groups.

Embodiment 24D is the method of any one of embodiments 1D to 5D, wherein the polymeric sorbent has nitrogen-containing groups of formula —NH—(C=NH)—NHR$_1$, —NR$_1$—(C=NH)—NH$_2$, or both. Group R$_1$ is hydrogen or an alkyl.

Embodiment 25D is the method of any one of embodiments 1D to 5D, wherein the polymeric sorbent has nitrogen-containing groups of formula —NR$_1$—R$_7$—(NHR$_1$)$_{z-1}$. Group R$_1$ is hydrogen or alkyl; R$_7$ is a z-valent radical of an alkane or of a heteroalkane; and z is an integer in a range of 3 to 10.

Embodiment 26D is the method of any one of embodiments 1D to 25D, wherein the polymeric sorbent further comprising an acid-base dye.

Embodiment 27D is the method of embodiment 26D, wherein the acid-base dye has a lower pK$_b$ than the nitrogen-containing compound.

Embodiment 28D is the method of embodiment 26D or 27D, wherein a difference between the pKb of the nitrogen-containing compound and the pK$_b$ of the acid-base dye is equal to at least 2.

Embodiment 29D is the method of any one of embodiments 1D to 28D, wherein the polymeric sorbent has a BET specific surface area equal to at least 25 m$^2$/gram.

EXAMPLES

TABLE 1

| List of materials | |
| --- | --- |
| Chemical Name | Chemical Supplier |
| Divinylbenzene (DVB) (80% tech grade), which contained 80 weight percent DVB and 20 weight percent styrene-type monomers. The calculation of moles of DVB used to prepare the polymeric material does take into account the purity. | Sigma-Aldrich, Milwaukee, WI |
| Maleic anhydride (MA) | Alfa Aesar, Ward Hill, MA |
| Benzoyl peroxide (BPO) | Sigma-Aldrich, Milwaukee, WI |
| Ethyl acetate (EtOAc) | EMD Millipore Chemicals, Billerica, MA |
| Hydrazine monohydrate | Alfa Aesar, Ward Hill, MA |
| Ethanol-denatured (EtOH) | EMD Millipore Chemicals, Billerica, MA |
| Ammonium hydroxide (28-30 wt. % ammonia) | EM Science, Gibbstown, NJ |
| Ethylenediamine (EDA) | Alfa Aesar, Ward Hill, MA |
| N,N'-dimethylethylenediamine (DMEDA) | TCI America, Tokyo, Japan |

TABLE 1-continued

| List of materials | |
| --- | --- |
| Chemical Name | Chemical Supplier |
| Polyethyleneimine, branched (MW 600) | Polysciences, Warrington, PA |
| VAZO 52 | E. I. du Pont de Nemours, Wilmington, DE |
| Chrysoidine | Sigma-Aldrich, Milwaukee, WI |
| Methyl red | Alfa Aesar, Ward Hill, MA |
| Bromoxylenol blue | Sigma-Aldrich, Milwaukee, WI |
| Formalin (37 wt. % formaldehyde) | Sigma-Aldrich, Milwaukee, WI |

Gas Sorption Analysis:

Porosity and gas sorption experiments were performed using a Micromeritics Instrument Corporation (Norcross, Ga.) accelerated surface area and porosimetry (ASAP) 2020 system using adsorbates of ultra-high purity. The following is a typical method used for the characterization of the porosity within the exemplified materials. In a Micromeritics half inch diameter sample tube, 50-250 milligrams of material was degassed by heating under ultra-high vacuum (3-7 micrometers Hg) on the analysis port of the ASAP 2020 to remove residual solvent and other adsorbates. The degas procedure for the precursor polymeric materials was 2 hours at 150° C. The degas procedure for the polymeric sorbents was 2 hours at 80° C. Argon sorption isotherms at 77° K were obtained using low pressure dosing (5 cm$^3$/g) at a relative pressure)(p/p° less than 0.1 and a pressure table of linearly spaced pressure points for a p/p° from 0.1 to 0.98. The method for all isotherms made use of the following equilibrium intervals: 90 seconds at p/p° less than 10$^{-5}$, 40 seconds at p/p° in a range of 10$^{-5}$ to 0.1, and 20 seconds at p/p° greater than 0.1. Helium was used for the free space determination, after argon sorption analysis, both at ambient temperature and at 77° K. BET specific surface areas (SA-$_{BET}$) were calculated from argon adsorption data by multi-point Brunauer-Emmett-Teller (BET) analysis. Apparent micropore distributions were calculated from argon adsorption data by density functional theory (DFT) analysis using the argon at 77° K on carbon slit pores by non-linear density functional theory (NLDFT) model. Total pore volume was calculated from the total amount of argon adsorbed at a p/p° equal to approximately 0.98. BET, DFT and total pore volume analyses were performed using Micromeritics MicroActive Version 1.01 software.

Formaldehyde Capacity Test

A simple flow-through custom-built delivery system was used to deliver known concentrations of formaldehyde to the sample for measurement. Plastic tubing was used throughout the delivery system, with the portions downstream of the formaldehyde generation being fluoropolymer tubing. Formaldehyde was generated by delivering a 6.33 wt. % solution of paraformaldehyde in water using a 2.5 mL gas-tight syringe. This syringe was driven at a specific rate by a syringe pump (KD Scientific, Holliston, Mass., USA). By knowing the paraformaldehyde concentration in solution, and the cross-sectional area of the syringe, a precise rate of paraformaldehyde solution could be delivered. This solution was delivered onto a piece of hot gold foil in a flask, which served to decompose the paraformaldehyde and vaporize the resulting formaldehyde. Through this flask, 250 mL/minute of nitrogen gas was passed, controlled by an analog mass flow controller (Aalborg, Orangeburg, N.Y., USA). This controller was calibrated by placing a Gilibrator-2 Primary Airflow Calibrator (Sensidyne, St. Petersburg, Fla., USA) at the output of the controller. The Gilibrator flow meter was used to measure a range of flows from each flow controller that was used to generate calibration curves. The evaporation of the formaldehyde served to create a 250 ppm concentration of formaldehyde in the nitrogen. Water was also evaporated into the nitrogen which humidified the stream to approximately 50% relative humidity. Using this set-up, a humidified stream of formaldehyde in nitrogen consisting of 250 ppm formaldehyde at 50% relative humidity with a flow of 250 mL/min. was achieved.

A sample to be tested for formaldehyde removal capability was added to a tared test tube (1.0 cm inner diameter) until the bed depth in the tube was 1.0 cm after being tamped. The mass of the sample was then determined by weighing the sample in the test tube. The test tube was then connected in line with the system allowing the 250 ppm formaldehyde gas stream to flow through the sample. To the downstream side of the test tube, tubing was connected that led to a gas chromatograph instrument (SRI 8610C, SRI Instruments, Torrance, Calif., USA) with a methanizer equipped flame ionization detector (FID). At the time the formaldehyde gas stream began to pass through the test sample, the test was considered started, and a timer was started. Additionally, the gas chromatograph software recorded the timestamp of every data point taken. The gas chromatograph then periodically sampled the gas stream and passed the sample through a RESTEK RT-U-Bond 30 meter in length column (Restek Corporation, Bellefonte, Pa., USA).

The effluent from this column was then passed through a methanizer followed by a FID. The Methanizer served to convert the formaldehyde to methane, which was then ionized and detected by the FID. This signal was subsequently reported and recorded in the data acquisition software provided with the device. It was observed that good detection of formaldehyde vapor was found when the gas chromatograph sampled the gas stream for 6 seconds, allowed the sample to pass through the column for 144 seconds and then allowed 60 seconds to flush out the sample before it drew in the next sample to be analyzed.

The gas chromatograph was calibrated by delivering formaldehyde at different rates into the nitrogen stream. In this way, a signal to concentration curve could be made so that any level of signal on the gas chromatograph could be correlated to a concentration of formaldehyde. The end of the formaldehyde vapor test was defined as the point corresponding to the time at which the formaldehyde effluent passing through the bed of the test material produced a signal on the FID detector that exceeded the signal corresponding to 1 ppm. The performance of each test material was reported as the number of minutes until 1 ppm breakthrough was observed performing the test as described above. In addition, the area under the curve of the breakthrough plot until 1 ppm breakthrough coupled with the known mass of the test material used in this fixed volume test was used to calculate a mmoles/gram capacity for each test material using a sum of least squares equation.

Acetaldehyde Capacity Test

A simple flow-through custom-built delivery system was used to deliver known concentrations of acetaldehyde to the sample for measurement. A compressed gas cylinder containing 15375 ppm of acetaldehyde (+/−2%) in nitrogen (Oxygen Service Company, St. Paul, Minn., USA) was used to deliver acetaldehyde to the system. This gas cylinder was plumbed to a digital mass flow controller (available under the designation DFC26 from Aalborg, Orangeburg, N.Y., USA) with a 0-10 mL/min. flow capability. This mass flow controller was plumbed to a second digital mass flow controller with a 0-50 ml/min. flow capability that was used to deliver dry nitrogen to the system. The nitrogen was humidified by passing it through a NAFION tube submerged in a water bath. By adjusting the length of the submerged NAFION tubing, different concentrations of water vapor in the nitrogen could be achieved. By adjusting the flow rates of the mass flow controllers flowing the acetaldehyde-containing gas stream and the humidified nitrogen-containing gas stream, a humidified stream of acetaldehyde in nitrogen consisting of 240 ppm acetaldehyde at 80% relative humidity with a flow of 50 mL/min. was achieved.

A sample to be tested for acetaldehyde removal capability was added to a tared test tube (7 mm inner diameter) until the bed depth in the tube was 0.5 cm after being tamped. The mass of the sample was then determined by weighing the sample in the test tube. The test tube was then connected in line with the system allowing the acetaldehyde gas stream to flow through the sample. To the downstream side of the test tube, tubing was connected that led to a gas chromatograph instrument (SRI 8610C) equipped with a FID. At the time the acetaldehyde gas stream began to pass through the test sample, the test was considered started, and a timer was started. Additionally, the gas chromatograph software recorded the timestamp of every data point taken. The gas chromatograph then periodically sampled the gas stream and passed the sample through a RESTEK RT-U-Bond 30 meter in length column.

The effluent from this column was then passed through a FID. The FID served to ionize the acetaldehyde in a hydrogen flame and detect the ionized molecules. This signal was subsequently reported and recorded in the data acquisition software provided with the device. It was observed that good detection of acetaldehyde vapor was found when the gas chromatograph sampled the gas stream for 6 seconds, allowed the sample to pass through the column for 114 seconds and then allowed 60 seconds to flush out the sample before it drew in the next sample to be analyzed.

The gas chromatograph was calibrated by delivering acetaldehyde at different rates into the gas stream. In this way, a signal to concentration curve could be made so that any level of signal on the gas chromatograph could be correlated to a concentration of acetaldehyde. The end of the acetaldehyde vapor test was defined as the point corresponding to the time at which the acetaldehyde effluent passing through the bed of the test material produced a signal on the FID detector that exceeded the signal corresponding to 50 ppm. The performance of each test material was reported as the number of minutes until 50 ppm breakthrough was observed performing the test as described above. In addition, the area under the curve of the breakthrough plot until 50 ppm breakthrough coupled with the known mass of the test material used in this fixed volume test was used to calculate a mmoles/gram capacity for each test material using a sum of least squares equation.

Examples 1-4

In a 5 L round-bottom flask, 78.2 grams (481 mmoles) divinylbenzene (DVB) (80 wt. %, tech grade), 29.4 grams (300 mmoles) of maleic anhydride (MA), and 2.15 grams (8.88 mmoles) of benzoyl peroxide (BPO) were dissolved in 2153 grams of ethyl acetate (EtOAc). The polymerizable composition had 4.9 wt. % solids in EtOAc and contained a monomer mixture (58.1 wt. % DVB, 27.3 wt. % MA, and 14.5 wt. % styrene-type monomers) and 2 wt. % BPO (based on total weight of monomers). The polymerizable composition was bubbled with nitrogen for 30 minutes. The flask was then capped with a rubber septum and placed in a sand bath at 95° C. The polymerizable composition was heated at this elevated temperature for 18 hours. A white precipitate that had formed was isolated by vacuum filtration and washed with EtOAc. The solid was divided up and placed in three 32 ounce jars. The jars were then each filled with 750 mL of EtOAc. The solids were allowed to stand in EtOAc for one hour at room temperature. The solids were again isolated by vacuum filtration and washed with EtOAc. The solid was divided up again and placed in three 32 ounce jars. The jars were then each filled with 750 mL of EtOAc. The solids were allowed to stand in EtOAc overnight. The solids were again isolated by vacuum filtration and washed with EtOAc. The solid was then dried under high vacuum at 95° C. overnight. This precursor polymeric material had a $SA_{BET}$ of 624.5 m$^2$/gram and a total pore volume of 0.606 cm$^3$/gram (p/p° equal to 0.975) as determined by argon adsorption.

The amine functional polymeric sorbents of Examples 1-4 were prepared by reacting the precursor polymeric material described above with ammonium hydroxide/water (Example 1), hydrazine monohydrate/ethanol (EtOH) (Example 2), ethylene diamine (EDA)/EtOH (Example 3), or N,N'-dimethylethylene-diamine (DMEDA)/EtOH (Example 4), respectively.

More specifically, the amine functional polymeric sorbent of Example 1 was prepared using the following procedure. In a 32 ounce jar, 5.0 mL (72.5 mmoles) of 14.5 M aqueous ammonium hydroxide was dissolved in 85 mL of deionized water. To this solution was added 3.00 grams of the precursor polymeric material. The jar was capped and placed in a sand bath at 90° C. This suspension was heated at this elevated temperature for 18 hours. The solid was isolated by vacuum filtration and washed with deionized water. The solid was placed in an 8 ounce jar, and 150 mL of deionized water was added to the jar. The solid was allowed to stand in the deionized water for four hours. The solid was again isolated by vacuum filtration and washed with deionized water. The solid was then dried under high vacuum at 80° C. for eight hours.

More specifically, the amine functional polymeric sorbent of Example 2 was prepared using the following procedure. In an 8 ounce jar, 5.5 mL (113 mmoles) of hydrazine monohydrate was dissolved in 150 mL EtOH. To this solution was added 5.00 g of the precursor polymeric material. The jar was capped and placed in a sand bath at 80° C. This suspension was heated at this elevated temperature for 18 hours. The solid was isolated by vacuum filtration and washed with EtOH. The solid was placed in an 8 ounce jar, and 150 mL of EtOH was added to the jar. The solid was allowed to stand in the EtOH for four hours. The solid was again isolated by vacuum filtration and washed with EtOH. The solid was again placed in an 8 ounce jar and 150 mL of EtOH was added to the jar. The solid was allowed to stand in the EtOH for another four hours. The solid was again isolated by vacuum filtration and washed with EtOH. The solid was then dried under high vacuum at 80° C. for eight hours.

More specifically, the amine functional polymeric sorbent of Example 3 was prepared using the following procedure. In a 32 ounce jar, 29.8 mL (446 mmoles) of EDA was dissolved in 600 mL of EtOH. To this solution was added 10.0 grams of the precursor polymeric material. The jar was capped and placed in a sand bath at 80° C. This suspension was heated at this elevated temperature for 18 hours. The solid was isolated by vacuum filtration and washed with EtOH. The solid was placed in an 8 ounce jar, and 150 mL of EtOH was added to the jar. The solid was allowed to stand in the EtOH for four hours. The solid was again isolated by vacuum filtration and washed with EtOH. The solid was then dried under high vacuum at 80° C. for eight hours.

More specifically, the amine functional polymeric sorbent of Example 4 was prepared using the following procedure. In an 8 ounce jar, 4.80 mL (44.6 mmoles) of DMEDA was dissolved in 96 mL of EtOH. To this solution was added 1.00 gram of the precursor polymeric material. The jar was capped and placed in a sand bath at 80° C. This suspension was heated at this elevated temperature for 18 hours. The solid was isolated by vacuum filtration and washed with EtOH. The solid was placed in a 4 ounce jar, and 50 mL of EtOH was added to the jar. The solid was allowed to stand in the EtOH for four hours. The solid was again isolated by vacuum filtration and washed with EtOH. The solid was then dried under high vacuum at 80° C. for eight hours. The amine used to prepare each sample, the $SA_{BET}$, and the total pore volume of each amine functional polymeric sorbent are shown in Table 2.

TABLE 2

Porosity characterization of the amine functional polymeric sorbents of Examples 1-4.

| Example # | Amine Used To Prepare | $SA_{BET}$ (m$^2$/g) | Total Pore Volume (cm$^3$/g) (p/p°) |
|---|---|---|---|
| Example 1 | Ammonium hydroxide | 377.1 | 0.371 (0.977) |
| Example 2 | Hydrazine monohydrate | 524.1 | 0.529 (0.976) |
| Example 3 | EDA | 466.5 | 0.485 (0.977) |
| Example 4 | DMEDA | 506.5 | 0.540 (0.977) |

The amine functional polymeric sorbents of Examples 1-4 were each individually sieved to 40×80 mesh size, and this material was used to perform the formaldehyde vapor test, as described above, to determine the formaldehyde capacity of each amine functional polymeric sorbent. The mass of the sample used for the test, the number of minutes each test lasted and the calculated mmoles/gram capacity are shown in Table 3.

TABLE 3

Adsorption of formaldehyde by Examples 1-4.

| Example # | Test Material Mass (grams) | Minutes Until 1 ppm Breakthrough | Capacity (mmoles/gram) |
|---|---|---|---|
| Example 1 | 0.246 | 131 | 1.33 |
| Example 2 | 0.190 | 64 | 0.84 |
| Example 3 | 0.156 | 234 | 3.74 |
| Example 4 | 0.188 | 120 | 1.59 |

In addition, sieved to 40×140 mesh size material of the amine functional polymeric sorbent of Example 3 was used to perform the acetaldehyde vapor test, as described above, to determine the acetaldehyde capacity of this amine functional polymeric sorbent. The mass of the sample used for the test, the number of minutes the test lasted and the calculated mmoles/gram capacity are shown in Table 4.

TABLE 4

Adsorption of acetaldehyde by Example 3.

| Example # | Test Material Mass (grams) | Minutes Until 50 ppm Breakthrough | Capacity (mmoles/gram) |
|---|---|---|---|
| Example 3 | 0.0506 | 172 | 1.53 |

Example 5-8

A series of four precursor polymeric materials was prepared using different ratios of the monomers DVB (80 wt. % purity, technical grade) and MA. The polymerizable composition used to make each precursor polymeric material had 5.0 wt. % solids in EtOAc and 2.0 wt. % BPO (based on total weight of monomers). The monomer composition by weight is shown for each precursor polymeric material in Table 5. The following procedure was used to prepare these four precursor polymeric materials. Each polymerizable composition was bubbled with nitrogen for 10 minutes. Each jar was then capped and placed in a sand bath at 95° C. Each polymerizable composition was heated at this elevated temperature for 17 hours. A white precipitate that formed in each jar was isolated by vacuum filtration and washed with EtOAc. Each solid was placed in a 4 ounce jar and 100 mL of EtOAc was added to the jar. Each solid was allowed to stand in EtOAc for one hour at room temperature. Each solid was again isolated by vacuum filtration and washed with EtOAc. Each solid was again placed in a 4 ounce jar and 100 mL of EtOAc was added to the jar. Each solid was allowed to stand in EtOAc overnight. Each solid was again isolated by vacuum filtration and washed with EtOAc. Each solid was then dried under high vacuum at 95° C. overnight. The SA$_{BET}$ and total pore volume for each precursor polymeric material as determined by argon adsorption is shown in Table 5. The precursor polymeric materials are referred to as Preparatory Examples 5-1 to 8-1 (PE 5-1 to PE 8-1).

TABLE 5

Composition and characterization of precursor polymeric materials PE 5-1 to PE 8-1.

| Preparatory Example | Wt. % DVB | Wt. % MA | Wt. % St | SA$_{BET}$ (m$^2$/g) | Total Pore Volume (cm$^3$/g) (p/p°) |
|---|---|---|---|---|---|
| PE 5-1 | 51.0 | 36.2 | 12.8 | 612.9 | 0.581 (0.973) |
| PE 6-1 | 45.7 | 42.9 | 11.4 | 518.6 | 0.495 (0.977) |
| PE 7-1 | 37.6 | 53.0 | 9.4 | 407.9 | 0.382 (0.980) |
| PE 8-1 | 31.9 | 60.1 | 8.0 | 387.4 | 0.350 (0.979) |

The four amine functional polymeric sorbents of Examples 5-8 were prepared by reacting the precursor polymeric materials PE 5-1 to 8-1 with hydrazine monohydrate in ethanol. The amounts of ethanol and hydrazine monohydrate used in each reaction to prepare the amine functional polymeric sorbents of Examples 5-8 are shown in Table 6. The following procedure was used to prepare the amine functional polymeric sorbents of Examples 5-8. In a 4 ounce jar, 0.500 grams of the precursor polymeric material was submerged in an ethanolic hydrazine monohydrate solution. The jar was capped and placed in a sand bath at 80° C. This suspension was heated at this elevated temperature for 18 hours. The solid was isolated by vacuum filtration and washed with EtOH. The solid was placed in a 4 ounce jar, and 50 mL of EtOH was added to the jar. The solid was allowed to stand in the EtOH for four hours. The solid was again isolated by vacuum filtration and washed with EtOH. The solid was again placed in a 4 ounce jar and 50 mL of EtOH was added to the jar. The solid was allowed to stand in the EtOH for another four hours. The solid was again isolated by vacuum filtration and washed with EtOH. The solid was then dried under high vacuum at 80° C. for eight hours. The SABET and the total pore volume for each precursor polymeric material as determined by argon adsorption are shown in Table 6.

TABLE 6

Reagent amounts used to prepare and characterization of Examples 5-8.

| Preparatory Example | Amount of Hydrazine Monohydrate (mL) | Amount of Ethanol (mL) | SA$_{BET}$ (m$^2$/g) | Total Pore Volume (cm$^3$/g) (p/p°) |
|---|---|---|---|---|
| Example 5 | 0.325 | 20 | 424.2 | 0.472 (0.975) |
| Example 6 | 0.430 | 20 | 350.7 | 0.418 (0.993) |
| Example 7 | 1.65 | 45 | 241.3 | 0.391 (0.966) |
| Example 8 | 2.20 | 60 | 223.3 | 0.346 (0.963) |

The amine functional polymeric sorbents of Examples 5-8 were each individually sieved to 40×80 mesh size, and this material was used to perform the formaldehyde vapor test, as described above, to determine the formaldehyde capacity of each amine functional polymeric sorbent. The mass of the sample used for the test, the number of minutes each test lasted and the calculated mmoles/gram capacity are shown in Table 7.

TABLE 7

Adsorption of formaldehyde by Examples 5-8.

| Example # | Test Material Mass (grams) | Minutes Until 1 ppm Breakthrough | Capacity (mmoles/gram) |
|---|---|---|---|
| Example 5 | 0.194 | 111 | 1.43 |
| Example 6 | 0.294 | 191 | 1.62 |
| Example 7 | 0.272 | 225 | 2.07 |
| Example 8 | 0.399 | 240 | 1.51 |

Example 9-13

A series of five non-hydrolyzed precursor polymeric materials was prepared using different ratios of the monomers DVB (80 wt. % purity, technical grade) and MA and different % solids for the polymerization composition. The polymerizable composition used to make each precursor polymeric material had 2.0 wt. % BPO (based on total weight of monomers). The monomer composition by weight and the % solids are shown for each precursor polymeric material in Table 8. The following procedure was used to prepare these four precursor polymeric materials. Each polymerizable composition was bubbled with nitrogen for 10 minutes. Each jar was then capped and placed in a sand bath at 95° C. Each polymerizable composition was heated at this elevated temperature for 17 hours. A white precipitate that formed in each jar was isolated by vacuum filtration and washed with EtOAc. Each solid was placed in a 4 ounce jar and 100 mL of EtOAc was added to the jar. Each solid was allowed to stand in EtOAc for one hour at room temperature.

Each solid was again isolated by vacuum filtration and washed with EtOAc. Each solid was again placed in a 4 ounce jar and 100 mL of EtOAc was added to the jar. Each solid was allowed to stand in EtOAc overnight. Each solid was again isolated by vacuum filtration and washed with EtOAc. Each solid was then dried under high vacuum at 95° C. overnight. The SABET and total pore volume for each precursor polymeric material as determined by argon adsorption is shown in Table 8. The precursor polymeric materials are referred to as Preparatory Examples 9-1 to 13-1 (PE 9-1 to PE 13-1).

TABLE 8

Composition and characterization of precursor polymeric materials PE 9-1 to PE 13-1.

| Preparatory Example | Wt. % DVB | Wt. % MA | Wt. % St | % Solids | $SA_{BET}$ (m²/g) | Total Pore Volume (cm³/g) (p/p°) |
|---|---|---|---|---|---|---|
| PE 9-1 | 45.6 | 43.0 | 11.4 | 50 | 290.6 | 0.241 (0.977) |
| PE 10-1 | 43.6 | 45.5 | 10.9 | 50 | 249.4 | 0.219 (0.978) |
| PE 11-1 | 37.6 | 53.0 | 9.4 | 50 | 206.5 | 0.201 (0.978) |
| PE 12-1 | 31.9 | 60.1 | 8.0 | 50 | 240.4 | 0.275 (0.959) |
| PE 13-1 | 31.9 | 60.1 | 8.0 | 66 | 101.3 | 0.113 (0.979) |

The four amine functional polymeric sorbents of Examples 9-13 were prepared using 0.75 M ethanolic solutions of EDA. More specifically, 3.0 grams of each precursor polymeric material PE 9-1 to 13-1 was placed in a 16 ounce jar and a 0.75 M solution of EDA in ethanol was added such that there was a 16:1 molar ratio of EDA to the maleic anhydride groups of the precursor polymeric material. Thus, the amine functional polymeric sorbents of Examples 9-13 were prepared using 280, 296, 346, 393 and 393 mL, respectively, of 0.75 M ethanolic EDA. The jar was capped and placed in a sand bath at 80° C. This suspension was heated at this elevated temperature for 18 hours. The solid was isolated by vacuum filtration and washed with EtOH. The solid was placed in a 4 ounce jar, and 50 mL of EtOH was added to the jar. The solid was allowed to stand in the EtOH for four hours. The solid was again isolated by vacuum filtration and washed with EtOH. The solid was then dried under high vacuum at 80° C. for eight hours. The SABET and the total pore volume for each precursor polymeric material as determined by argon adsorption are shown in Table 9.

TABLE 9

Characterization of amine functional polymeric sorbents Examples 9-13.

| Preparatory Example | $SA_{BET}$ (m²/g) | Total Pore Volume (cm³/g) (p/p°) |
|---|---|---|
| Example 9 | 121.6 | 0.143 (0.978) |
| Example 10 | 109.2 | 0.128 (0.978) |
| Example 11 | 110.0 | 0.133 (0.976) |
| Example 12 | 127.5 | 0.159 (0.977) |
| Example 13 | 63.1 | 0.085 (0.978) |

The amine functional polymeric sorbents of Examples 9-13 were each individually sieved to 40×80 mesh size, and this material was used to perform the formaldehyde vapor test, as described above, to determine the formaldehyde capacity of each amine functional polymeric sorbent. The mass of the sample used for the test, the number of minutes each test lasted and the calculated mmoles/gram capacity are shown in Table 10.

TABLE 10

Adsorption of formaldehyde by Examples 9-13.

| Example # | Test Material Mass (grams) | Minutes Until 1 ppm Breakthrough | Capacity (mmoles/gram) |
|---|---|---|---|
| Example 9 | 0.244 | 328 | 3.59 |
| Example 10 | 0.260 | 375 | 3.61 |
| Example 11 | 0.258 | 365 | 3.53 |
| Example 12 | 0.268 | 458 | 4.27 |
| Example 13 | 0.324 | 333 | 2.57 |

Example 14

In a 2 L Parr stainless steel pressure vessel, 177.11 grams (1.09 moles) DVB (80 wt. %, tech grade), 240.05 grams (2.45 moles) of MA, and 4.17 grams (16.8 mmoles) of VAZO 52 were dissolved in 625.92 grams of EtOAc. The polymerizable composition had 40.0 wt. % solids in EtOAc and contained a monomer mixture (34.0 wt. % DVB, 57.5 wt. % MA, and 8.5 wt. % styrene-type monomers) and 1 wt. % VAZO 52 (based on total weight of monomers). The polymerizable composition was bubbled with nitrogen for 15 minutes. The pressure vessel was then sealed and placed in a heating mantle at 60° C. The polymerizable composition was heated at this elevated temperature for 18 hours. A white precipitate that had formed was isolated by vacuum filtration and washed with EtOAc. The solid was placed in a 4 L Erlenmeyer flask and 2.0 L of EtOAc was added to the flask. The solid was allowed to stand in EtOAc for one hour at room temperature. The solid was again isolated by vacuum filtration and washed with EtOAc. The solid was placed in a 4 L Erlenmeyer flask and 2.0 L of EtOAc was added. The solid was allowed to stand in EtOAc overnight. The solid was again isolated by vacuum filtration and washed with EtOAc. The solid was then dried in a batch oven at 100° C. for 18 hours. This precursor polymeric material had a SABET of 320.8 m²/gram and a total pore volume of 0.250 cm³/gram (p/p° equal to 0.977) as determined by argon adsorption.

In a 32 ounce jar, 95.0 grams (158 mmoles) of a 600 MW branched polyethyleneimine was dissolved in 478 mL of EtOH. To this solution was added 20.0 grams of the precursor polymeric material. The jar was capped and placed in a sand bath at 80° C. This suspension was heated at this elevated temperature for 18 hours. The solid was isolated by vacuum filtration and washed with EtOH. The solid was placed in an 8 ounce jar, and 100 mL of EtOH was added to the jar. The solid was allowed to stand in the EtOH for four hours. The solid was again isolated by vacuum filtration and washed with EtOH. The solid was then dried under high vacuum at 120° C. for three hours. This amine functional polymeric sorbent had a $SA_{BET}$ of 110.4 m²/gram and a total pore volume of 0.167 cm³/gram (p/p° equal to 0.980) as determined by argon adsorption.

The amine functional polymeric sorbent of Example 14 was sieved to 40×80 mesh size, and this material was used to perform the formaldehyde vapor test, as described above, to determine the formaldehyde capacity of this amine functional polymeric sorbent. The mass of the sample used for the test, the number of minutes the test lasted and the calculated mmoles/gram capacity are shown in Table 11.

TABLE 11

Adsorption of formaldehyde by Example 14.

| Example # | Test Material Mass (grams) | Minutes Until 1 ppm Breakthrough | Capacity (mmoles/gram) |
|---|---|---|---|
| Example 14 | 0.583 | 525 | 2.21 |

Examples 15-17

In a 1 L Parr stainless steel pressure vessel, 88.67 grams (0.545 moles) DVB (80 wt. %, tech grade), 120.02 grams (1.22 moles) of MA, and 2.09 grams (8.64 mmoles) of BPO were dissolved in 208.50 grams of EtOAc. The polymerizable composition had 50.0 wt. % solids in EtOAc and contained a monomer mixture (34.0 wt. % DVB, 57.5 wt. % MA, and 8.5 wt. % styrene-type monomers) and 1 wt. % BPO (based on total weight of monomers). The polymerizable composition was bubbled with nitrogen for 15 minutes. The pressure vessel was then sealed and placed in a heating mantle at 90° C. The polymerizable composition was heated at this elevated temperature for 18 hours. A white precipitate that had formed was isolated by vacuum filtration and washed with EtOAc. The solid was placed in a 2 L Erlenmeyer flask and 1.0 L of EtOAc was added to the flask. The solid was allowed to stand in EtOAc for one hour at room temperature. The solid was again isolated by vacuum filtration and washed with EtOAc. The solid was placed in a 2 L Erlenmeyer flask and 1.0 L of EtOAc was added. The solid was allowed to stand in EtOAc overnight. The solid was again isolated by vacuum filtration and washed with EtOAc. The solid was then dried in a batch oven at 100° C. for 18 hours. This precursor polymeric material had a $SA_{BET}$ of 201.1 m²/gram and a total pore volume of 0.170 cm³/gram (p/p° equal to 0.980) as determined by argon adsorption.

In a 32 ounce jar, 131 mL (1.96 moles) of EDA was dissolved in 262 mL of EtOH. To this solution was added 20.0 grams of the precursor polymeric material. The jar was capped and placed in a sand bath at 80° C. This suspension was heated at this elevated temperature for 18 hours. The solid was isolated by vacuum filtration and washed with EtOH. The solid was placed in an 8 ounce jar, and 100 mL of EtOH was added to the jar. The solid was allowed to stand in the EtOH for four hours. The solid was again isolated by vacuum filtration and washed with EtOH. The solid was then dried under high vacuum at 80° C. for eight hours. This amine functional polymeric sorbent was sieved to 40×80 mesh size.

The three dye impregnated amine functional polymeric sorbents of Examples 15-17 were prepared using ethanolic solutions of chrysoidine, methyl red and bromoxylenol blue, respectively. The following procedure was used to prepare Example 15. A 10 mg/mL ethanolic solution of chrysoidine was prepared by dissolving 100 milligrams of chrysoidine in 10 mL of EtOH in a 20 mL vial. To this solution was added 0.500 grams of the 40×80 mesh size amine functional polymeric sorbent. The vial was capped, and the solid was allowed to stand in the ethanolic dye solution for two hours. The solid was isolated by vacuum filtration without using additional ethanol to transfer or wash the material. The solid was then dried under high vacuum at 80° C. for four hours.

The following procedure was used to prepare Examples 16 and 17. Separate saturated ethanolic solutions of methyl red and bromoxylenol blue were prepared by adding 50 milligrams of methyl red and bromoxylenol blue to 10 mL of EtOH in a 20 mL vial. The resulting suspensions were filtered through a 1 micron glass frit filter (Pall Corporation, Port Washington, N.Y., USA) using a syringe to remove undissolved dye. These saturated dye solutions were put in separate 20 mL vials. To each solution was added 0.500 grams of the 40×80 mesh size amine functional polymeric sorbent. Each vial was capped, and each solid was allowed to stand in the ethanolic dye solution for two hours. Each solid was isolated by vacuum filtration without using additional ethanol to transfer or wash the material. Each solid was then dried under high vacuum at 80° C. for four hours.

The dyed amine functional polymeric sorbents of Examples 15-17 were each exposed to formaldehyde in a test chamber consisting of a 1.2 L crystallizing dish containing 200 mL of formalin solution (37 wt. % formaldehyde). 100 mg of each of the dyed amine functional polymeric sorbents of Examples 15-17 were placed in individual 10 mL crystallizing dishes and floated in the formalin solution. A glass plate was put over the large crystallizing dish. The color of each dyed amine functional polymeric sorbent was observed over time. After 30 minutes of exposure, each of the dyed amine functional polymeric sorbents had changed color. The dye used, the color before exposure and the color after exposure of each dyed amine functional polymeric sorbent are shown in Table 12. This test was repeated exactly as described above except that instead of formalin solution, deionized water was placed in the 1.2 L crystallizing dish. After 30 minutes of exposure to only moisture, none of the dyed amine functional polymeric sorbents showed any visual change in color.

TABLE 12

Color changing properties of the dyed amine functional polymeric sorbents of Examples 15-17 upon exposure to formaldehyde.

| Example # | Dye | Color Before Test | Color at Test Completion |
|---|---|---|---|
| Example 15 | Chrysoidine | yellow-orange | red |
| Example 16 | Methyl red | yellow | red |
| Example 17 | Bromoxylenol blue | navy blue | olive green |

What is claimed is:

1. A polymeric sorbent comprising a reaction product of
(a) a precursor polymeric material having maleic anhydride monomeric units and comprising a polymerized product of a polymerizable composition comprising
(1) 8 to 65 weight percent maleic anhydride based on the total weight of monomers in the polymerizable composition;
(2) 30 to 85 weight percent divinylbenzene based on the total weight of monomers in the polymerizable composition; and
(3) 0 to 20 weight percent of a styrene-type monomer based on the total weight of monomers in the polymerizable composition, wherein the styrene-type monomer is styrene, an alkyl-substituted styrene, or a combination thereof; and
(b) a nitrogen-containing compound that is selected from ammonia, a compound having a single primary amino group (—NH₂), or a compound having at least two amino groups of formula —NHR where R is hydrogen or alkyl, wherein at least 50 mole percent of the nitrogen-containing compound is added based on total moles of maleic anhydride monomeric units in the precursor polymeric material and wherein the polymeric sorbent has a covalently attached nitrogen-containing group.

2. The polymeric sorbent of claim 1, wherein the polymerizable composition comprises 15 to 65 weight percent maleic anhydride, 30 to 85 weight percent divinylbenzene, and 0 to 20 weight percent of a styrene-type monomer.

3. The polymeric sorbent of claim 1, wherein the polymerizable composition comprises 25 to 65 weight percent maleic anhydride, 30 to 75 weight percent divinylbenzene, and 1 to 20 weight percent styrene-type monomer.

4. The polymeric sorbent of claim 1, wherein the polymerizable composition comprises 30 to 65 weight percent maleic anhydride, 30 to 70 weight percent divinylbenzene, and 1 to 20 weight percent styrene-type monomer.

5. The polymeric sorbent of claim 1, wherein the nitrogen-containing compound is of Formula (V)

$$R_4NHR_1 \quad (V)$$

wherein
$R_1$ is hydrogen or an alkyl;
$R_4$ is hydrogen, alkyl, a group of formula —$R_5$—$NHR_6$, or —(C=NH)—$NH_2$;
$R_5$ is a covalent bond, an alkylene, an arylene, an aralkylene, a heteroalkylene having one or more oxy (—O—) groups, or a heteroalkylene having one or more —NH— groups; and
$R_6$ is hydrogen, alkyl, or —(C=NH)—$NH_2$.

6. The polymeric sorbent of claim 5, wherein the nitrogen-containing compound of Formula (V) has a molecular weight no greater than 2000 Daltons.

7. The polymeric sorbent of claim 4, wherein the nitrogen-containing compound is of Formula (VI)

$$R_7—(NHR_1)_z \quad (VI)$$

wherein
$R_7$ is a z-valent radical of an alkane or a z-valent radical of a heteroalkane; and
z is an integer in a range of 3 to 10.

8. The polymeric sorbent of claim 1, the polymeric sorbent further comprising an acid-base dye.

9. A method of sorbing an aldehyde on a polymeric sorbent, the method comprising:
providing a polymeric sorbent of claim 1;
sorbing the aldehyde on the polymeric sorbent, the aldehyde being of Formula (I)

$$R_2—(CO)—H \quad (I)$$

wherein $R_2$ is hydrogen, alkyl, vinyl, or aryl and wherein the molecular weight of the aldehyde of Formula (I) is no greater than 200 grams/mole.

10. The method of claim 9, wherein $R_2$ is hydrogen or methyl.

11. The method of claim 9, wherein the polymeric sorbent sorbs an amount of aldehyde in a range of 0.5 to 12 millimoles per gram based on a weight of the polymeric sorbent.

12. The method of claim 9, wherein the polymeric sorbent has a BET specific surface area equal to at least 25 m²/gram.

13. The method of claim 9, wherein the polymeric sorbent comprises an acid-base dye and wherein the acid-base dye changes color when the aldehyde sorption capacity of the polymeric sorbent is reached or is close to being reached.

14. A composition comprising:
(a) a polymeric sorbent of claim 1; and
(b) an aldehyde sorbed on the polymeric sorbent, the aldehyde being of Formula (I)

$$R_2—(CO)—H \quad (I)$$

wherein $R_2$ is hydrogen, alkyl, vinyl, or aryl and wherein the molecular weight of the aldehyde of Formula (I) is no greater than 200 grams/mole.

15. A method of forming a polymeric sorbent, the method comprising:
(a) providing a precursor polymeric material having maleic anhydride monomeric units and comprising a polymerized product of a polymerizable composition comprising
(1) 8 to 65 weight percent maleic anhydride based on the total weight of monomers in the polymerizable composition;
(2) 30 to 85 weight percent divinylbenzene based on the total weight of monomers in the polymerizable composition; and
(3) 0 to 20 weight percent of a styrene-type monomer based on the total weight of monomers in the polymerizable composition, wherein the styrene-type monomer is styrene, an alkyl-substituted styrene, or a combination thereof; and
(b) reacting the precursor polymeric material with a nitrogen-containing compound that is selected from ammonia, a compound having a single primary amino group (—$NH_2$), or a compound having at least two amino groups of formula —NHR where R is hydrogen or alkyl to form the polymeric sorbent, wherein at least 50 mole percent of the nitrogen-containing compound is added based on total moles of maleic anhydride monomeric units in the precursor polymeric material and wherein the polymeric sorbent has a covalently attached nitrogen-containing group.

* * * * *